US012330984B2

(12) United States Patent
Sato et al.

(10) Patent No.: US 12,330,984 B2
(45) Date of Patent: Jun. 17, 2025

(54) GLASS AND OPTICAL ELEMENT

(71) Applicant: HOYA CORPORATION, Tokyo (JP)

(72) Inventors: Koichi Sato, Tokyo (JP); Yoshitake Tanno, Tokyo (JP); Naomi Matsumoto, Tokyo (JP)

(73) Assignee: HOYA CORPORATION, Tokyo (JP)

( * ) Notice: Subject to any disclaimer, the term of this patent is extended or adjusted under 35 U.S.C. 154(b) by 599 days.

(21) Appl. No.: 17/587,298

(22) Filed: Jan. 28, 2022

(65) Prior Publication Data
US 2022/0250968 A1 Aug. 11, 2022

(30) Foreign Application Priority Data

Feb. 4, 2021 (JP) ................... 2021-016560

(51) Int. Cl.
*C03C 3/16* (2006.01)
*C03C 3/21* (2006.01)
*G02B 1/00* (2006.01)
*G02B 5/00* (2006.01)

(52) U.S. Cl.
CPC ............ *C03C 3/16* (2013.01); *C03C 3/21* (2013.01); *G02B 1/00* (2013.01); *G02B 5/00* (2013.01)

(58) Field of Classification Search
CPC ..................... C03C 3/16; C03C 3/21
See application file for complete search history.

(56) References Cited

U.S. PATENT DOCUMENTS

| 2002/0073735 | A1  | 6/2002 | Hayashi et al. |
| 2004/0138043 | A1* | 7/2004 | Kasuga ............ C03C 3/21 501/45 |
| 2010/0004112 | A1* | 1/2010 | Ohkawa ............ C03C 3/253 501/42 |
| 2021/0048665 | A1* | 2/2021 | Nakamura ......... G02B 5/003 |
| 2023/0250016 | A1* | 8/2023 | Ikenishi .............. C03C 3/21 428/210 |

FOREIGN PATENT DOCUMENTS

| JP | 2002-201041 A | 7/2002 |
| JP | 5792026 B2 | 8/2015 |
| JP | 2015-179788 A | 10/2015 |
| WO | WO 2020/230649 A1 | 11/2020 |

OTHER PUBLICATIONS

Office Action for JP App. No. 2021-016560, dated Apr. 23, 2024 (w/ translation).
Office Action for TW App. No. 110146027, dated Jan. 24, 2025 (w/ translation).

* cited by examiner

*Primary Examiner* — Elizabeth A. Bolden
(74) *Attorney, Agent, or Firm* — Greenblum & Bernstein, P.L.C.

(57) ABSTRACT

Provided is oxide glass in which a content of $P^{5+}$ is 7 to 43 cation %, a content of Nb ions is 10 to 21 cation %, a content of $Li^+$ is 20 cation % or more, a total content of Nb ions and $Li^+$ is 48 to 70 cation %, a content of Bi ions is more than 0 cation % and is equal to or less than 6 cation %, a content of $Ba^{2+}$ is 5 cation % or less, a content of $Zr^{4+}$ is 2 cation % or less, a total content of Ti ions and W ions is 5 cation % or less, and a cation ratio of the content of $Li^+$ to a total content of $Li^+$, $Na^+$, and $K^+[Li^+/(Li^++Na^++K^+)]$ is 0.5 or more.

13 Claims, 1 Drawing Sheet

FIRST MAIN SURFACE             SECOND MAIN SURFACE

FIRST MAIN SURFACE             SECOND MAIN SURFACE

GLASS AND OPTICAL ELEMENT

BACKGROUND OF THE INVENTION

The present invention relates to glass and an optical element.

Recently, an imaging module equipped with an imaging element such as CCD and CMOS has been used in a portable telephone, a portable information terminal device, and the like.

In the imaging element, a cover glass with a light-shielding frame is disposed on a front surface of a light-receiving portion. The cover glass includes a light-transmitting portion (transparent portion) through which light that is directly incident on the light-receiving portion of the imaging element is transmitted. The light-shielding frame is formed to surround the light-transmitting portion of the cover glass, and has an operation of shielding light such as stray light that is indirectly incident on the light-receiving portion. Typically, the light-shielding frame is separately formed on a surface of the cover glass with a material different from that of the light-transmitting portion.

Here, WO 2020/230649 A suggests glass including a colored layer that shields light, and a light-transmitting portion through which light is transmitted. According to the glass suggested in WO 2020/230649 A, it is possible to enable the colored layer that shields light to have a function as a light-shielding frame (light-shielding portion). In this case, it is possible to manufacture cover glass that integrally includes the light-shielding portion and the light-transmitting portion as one piece of glass.

When manufacturing the cover glass by using the glass suggested in WO 2020/230649 A, it is preferable that a transmittance of visible light, that is, light having a wavelength in a range of 380 to 1100 nm is relatively higher in the light-transmitting portion, and is relatively lower in the light-shielding portion.

In addition, typically, the cover glass is industrially produced by a method of dividing a large-sized glass sheet into a plurality of sheets. When the weight of the glass sheet increases, glass is likely to be broken in a production process, and the glass is likely to be warped. Therefore, in production of the cover glass, a glass sheet having small specific gravity is preferable.

SUMMARY OF THE INVENTION

The present invention has been made in consideration such circumstances, and a subject thereof is to provide glass that is capable of forming a light-shielding portion having excellent light-shielding properties and a light-transmitting portion having excellent light-transmitting properties with respect to visible light and has low specific gravity, and an optical element that includes a light-shielding portion having excellent light-shielding properties and a light-transmitting portion having excellent light-transmitting properties with respect to visible light and has low specific gravity.

The gist of the present invention is as follows.

(1) According to an aspect of the present invention, there is provided oxide glass,
   wherein a content of $P^{5+}$ is 7 to 43 cation %,
   a content of Nb ions is 10 to 21 cation %,
   a content of $Li^+$ is 20 cation % or more,
   a total content of Nb ions and $Li^+$ is 48 to 70 cation %,
   a content of Bi ions is more than 0 cation % and is equal to or less than 6 cation %,
   a content of $Ba^{2+}$ is 5 cation % or less,
   a content of $Zr^{4+}$ is 2 cation % or less,
   a total content of Ti ions and W ions is 5 cation % or less, and
   a cation ratio of the content of $Li^+$ to a total content of $Li^+$, $Na^+$, and $K^+$ [$Li^+/(Li^++Na^++K^+)$] is 0.5 or more.

(2) According to another aspect of the present invention, there is provided an optical element comprising the glass according to (1).

(3) According to still another aspect of the present invention, there is provided an optical element integrally including:
   a light-transmitting portion; and
   a light-shielding portion in which a transmittance of visible light is smaller in comparison to the light-transmitting portion,
   wherein the optical element comprises oxide glass containing $P^{5+}$, Nb ions, Bi ions, and $Li^+$ as a glass component, and
   the oxide glass satisfies at least one of the following conditions (i) and (ii),
   (i) a total content of Nb ions and $Li^+$ is 50 cation % or more, and
   (ii) a cation ratio of the content of $Li^+$ to a total content of $Li^+$, $Na^+$, and $K^+$ [$Li^+/(Li^++Na^++K^+)$] is 0.5 or more.

(4) According to still another aspect of the present invention, there is provided an optical element,
   wherein the optical element comprises glass having specific gravity of 3.5 or less,
   the optical element integrally includes a light-transmitting portion in which an internal transmittance at a wavelength of 380 nm in terms of a thickness of 1.0 mm is 96% or more, and a light-shielding portion in which an optical density OD at a wavelength of 1100 nm is 0.5 or more, and
   the light-transmitting portion and the light-shielding portion have the same glass composition.

(5) The optical element according to any one of (2) to (4), wherein the optical element is cover glass.

According to the aspects of the present invention, it is possible to provide glass that is capable of forming a light-shielding portion having excellent light-shielding properties and a light-transmitting portion having excellent light-transmitting properties with respect to visible light and has low specific gravity, and an optical element that includes a light-shielding portion having excellent light-shielding properties and a light-transmitting portion having excellent light-transmitting properties with respect to visible light and has low specific gravity.

DETAILED DESCRIPTION OF THE INVENTION

Figure 1:
FIG. 1 is a schematic view illustrating an example of an embodiment of the present invention.
Figure 1:
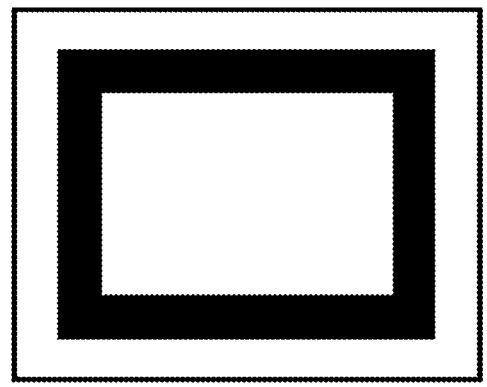

Hereinafter, the present invention will be separately described with reference to a first embodiment, a second embodiment, and a third embodiment. In the first to third embodiments, the present invention will be described on the basis of a glass composition in expression of cation %. Accordingly, in a content of a glass component, and a total content, "%" represents "cation %" unless otherwise stated.

Expression of cation % represents molar percentage when a total content of all cation components is set as 100%. In addition, a total content represents a total content of a plurality of kinds of cation components (also including a case where the content is 0%). In addition, a cation ratio represents a ratio of contents of cation components (also including a total content of a plurality of kinds of cation components) in expression of cation %.

Note that, anion % represents molar percentage when a total content of all anion components is set as 100%.

Valences of cation components (for example, a valence of $B^{3+}$ is +3, a valence of $Si^{4+}$ is +4, and a valence of $La^{3+}$ is +3) are conventionally determined values, and this is similar to notation of B, Si, and La as glass components in terms of oxides as $B_2O_3$, $SiO_2$, and $La_2O_3$. Accordingly, when analyzing a glass composition, it is not necessary to analyze the valences of the cation components. In addition, valences of anion components (for example, a valence of $O^{2-}$ is -2) are also conventionally determined values, and this is similar to notation of the glass components in terms of oxides, for example, as $B_2O_3$, $SiO_2$, and $La_2O_3$. Accordingly, when analyzing a glass composition, it is not necessary to analyze the valences of the anion components.

The content of a glass component can be quantified by a known method, for example, methods such as inductively coupled plasma atomic emission spectrometry (ICP-AES), inductively coupled plasma mass spectrometry (ICP-MS), etc. In addition, in this specification and the present invention, description of "the content of a constituent component is 0%" represents that the constituent component is substantially not contained, and the constituent component is allowed to be contained at an unavoidable impurity level.

In addition, in this specification, a refractive index represents a refractive index nd at a d-line (wavelength: 587.56 nm) of yellow helium unless otherwise stated.

An Abbe's number vd is used as a value that represents properties relating to dispersion, and is expressed by the following Expression. Here, nF represents a refractive index at an F-line (wavelength: 486.13 nm) of blue hydrogen, and nC represents a refractive index at a C-line (656.27 nm) of red hydrogen.

$$vd = (nd - 1)/(nF - nC)$$

First Embodiment

In oxide glass according to a first embodiment,
A content of $P^{5+}$ is 7% to 43%,
A content of Nb ions is 10% to 21%,
A content of $Li^+$ is 20% or more, A total content of Nb ions and $Li^+$ is 48% to 70%,
A content of Bi ions is more than 0% and is equal to or less than 6%,
A content of $Ba^{2+}$ is 5% or less,
A content of $Zr^{4+}$ is 2% or less,
A total content of Ti ions and W ions is 5% or less, and
A cation ratio of the content of $Li^+$ to a total content of $Li^+$, $Na^+$, and $K^+$ [$Li^+/(Li^++Na^++K^+)$] is 0.5 or more.

The glass according to the first embodiment is oxide glass, and mainly comprises oxides. In the present invention, the oxide glass represents glass that contains $O^{2-}$ as an anion component, and a content of $O^{2-}$ is 80 anion % or more.

That is, the oxide glass according to the first embodiment contains $O^{2-}$ as the anion component. In addition, in the oxide glass according to the first embodiment, the lower limit of the content of $O^{2-}$ is preferably 90 anion %, and more preferably 95 anion %, 97 anion %, or 98 anion % in this order. In addition, the upper limit of the content of $O^{2-}$ is preferably as large as possible, is preferably 100 anion %, and more preferably 99.5 anion % or 99 anion %. The content of $O^{2-}$ may be 100 anion %.

In the oxide glass according to the first embodiment, the lower limit of the content of $F^-$ is preferably 0 anion %, and more preferably 0.1 anion %, 0.2 anion %, or 0.3 anion % in this order. The content of $F^-$ may be 0 anion %. In addition, the upper limit of the content of $F^-$ is preferably 5.0 anion %, and more preferably 3.0 anion %, 1.0 anion %, or 0.5 anion % in this order.

The oxide glass according to the first embodiment may contain a component other than $F^-$ and $O^{2-}$ as an anion component. Examples of an anion component other than $F^-$ and $O^{2-}$ include $Cl^-$, $Br^-$, and $I^-$. However, any of $Cl^-$, $Br^-$, and $I^-$ is likely to volatile during melting of glass. Due to volatilization of the components, problems such as fluctuation of characteristics of the glass, reduction of homogeneity of the glass, and significant consumption of melting facility occur. Accordingly, the content of $Cl^-$ is preferably less than 5.0 anion %, and more preferably less than 3.0 anion %, less than 1.0 anion %, less than 0.5 anion %, or less than 0.3 anion % in this order. In addition, a total content of Br and $I^-$ is preferably less than 5.0 anion %, and more preferably less than 3.0 anion %, less than 1.0 anion %, less than 0.5 anion %, less than 0.1 anion %, or 0 anion % in this order.

In the oxide glass according to the first embodiment, the content of $P^{5+}$ is 7% to 43%. The lower limit of the content of $P^{5+}$ is preferably 10%, and more preferably 15%, 22%, or 27% in this order. In addition, the upper limit of the content of $P^{5+}$ is preferably 40%, and more preferably 37%, 34%, or 32% in this order.

$P^{5+}$ is a glass network forming component. When the content of $P^{5+}$ is set to the above-described range, glass that is capable of forming a light-shielding portion having excellent light-shielding properties and a light-transmitting portion having excellent light-transmitting properties with respect to visible light and has low specific gravity is obtained. On the other hand, when the content of $P^{5+}$ is excessively large, there is a concern that chemical durability deteriorates, and meltability also deteriorates.

In the oxide glass according to the first embodiment, the content of Nb ions is 10% to 21%. The lower limit of the content of Nb ions is preferably 11%, and more preferably 12%, 14%, or 16% in this order. In addition, the upper limit of the content of Nb ions is preferably 20%, and more preferably 19.5%, 19%, or 18% in this order. Nb ions may include Nb ions having different valence including $Nb^{5+}$.

Nb ions are a component that contributes to a high refractive index and increases coloration of glass. In addition, Nb ions have an operation of improving thermal stability and chemical durability of glass. When the content of Nb ions is set to the above-described range, glass capable of forming a light-shielding portion having excellent light-shielding properties and a light-transmitting portion having excellent light-transmitting properties with respect to visible light is obtained. On the other hand, when the content of Nb ions is excessively large, there is a concern that devitrification resistance of glass may deteriorate, and a transmittance of light in a short-wavelength region (wavelength: 300 to 450 nm) may deteriorate in the light-transmitting portion.

In the oxide glass according to the first embodiment, the content of $Li^+$ is 20% or more. The lower limit of the content of $Li^+$ is preferably 25%, and more preferably 30%, 35%, or 40% in this order. In addition, the upper limit of the content of $Li^+$ is preferably 60%, and more preferably 55%, 50%, or 47% in this order.

When the content of $Li^+$ is set to the above-described range, glass that is capable of forming a light-shielding portion having excellent light-shielding properties and a light-transmitting portion having excellent light-transmitting properties with respect to visible light and has low specific gravity is obtained. In addition, it is easy to perform chemical strengthening with respect to glass. On the other hand, when the content of $Li^+$ is excessively large, there is a concern that thermal stability of glass may deteriorate.

In the oxide glass according to the first embodiment, a total content of Nb ions and $Li^+$ is 48% to 70%. The lower limit of the total content is preferably 50%, and more preferably 52%, 54%, or 57% in this order. In addition, the upper limit of the total content is preferably 75%, and more preferably 70%, 66%, or 63% in this order.

When the total content of Nb ions and $Li^+$ is set to the above-described range, glass that is capable of forming a light-shielding portion having excellent light-shielding properties and a light-transmitting portion having excellent light-transmitting properties with respect to visible light and has low specific gravity is obtained. On the other hand, when the total content is excessively small, there is a concern that the light-shielding properties in the light-shielding portion may deteriorate.

In the oxide glass according to the first embodiment, the content of Bi ions is more than 0% and is equal to or less than 6%. The lower limit of the content of Bi ions is preferably 0.2%, and more preferably 0.3%, 0.4%, or 0.5% in this order. In addition, the upper limit of the content of Bi ions is preferably 5%, and more preferably 4%, 2%, or 1% in this order. Bi ions may include Bi ions having different valance including $Bi^{3+}$.

Bi ions contribute a high refractive index and have an operation of increasing coloration of glass. When the content of Bi ions is set to the above-described range, glass that is capable of forming a light-shielding portion having excellent light-shielding properties and a light-transmitting portion having excellent light-transmitting properties with respect to visible light is obtained. On the other hand, when the content of Bi ions is excessively large, there is a concern that a transmittance of light in a short-wavelength region (wavelength: 300 to 450 nm) may deteriorate in the light-transmitting portion. In addition, when the content of Bi ions is excessively small, there is a concern that light-shielding properties in the light-shielding portion may deteriorate.

In the oxide glass according to the first embodiment, the content of $Ba^{2+}$ is 5% or less. The upper limit of the content of $Ba^{2+}$ is preferably 4%, and more preferably 3%, 2%, or 1% in this order. In addition, the lower limit of the content of $Ba^{2+}$ is preferably 0%. The content of $Ba^{2+}$ may be 0%.

$Ba^{2+}$ has an operation of improving thermal stability and meltability of glass. When the content of $Ba^{2+}$ is set to the above-described range, glass having low specific gravity is obtained. On the other hand, when the content of $Ba^{2+}$ is excessively large, there is a concern that the specific gravity may increase, and devitrification resistance may deteriorate. Furthermore, there is a concern that the thermal stability of glass may deteriorate.

In the oxide glass according to the first embodiment, the content of $Zr^{4+}$ is 2% or less. The upper limit of the content of $Zr^{4+}$ is preferably 1.5%, and more preferably 1% or 0.5% in this order. In addition, the lower limit of the content of $Zr^{4+}$ is preferably 0%. The content of $Zr^{4+}$ may be 0%.

$Zr^{4+}$ has an operation of improving the thermal stability of glass. When the content of $Zr^{4+}$ is set to the above-described range, glass that is capable of forming a light-shielding portion having excellent light-shielding properties and a light-transmitting portion having excellent light-transmitting properties with respect to visible light and has low specific gravity is obtained. On the other hand, when the content of $Zr^{4+}$ is excessively large, the thermal stability and the meltability of glass tend to deteriorate.

In the oxide glass according to the first embodiment, a total content of Ti ions and W ions is 5% or less. The upper limit of the total content is preferably 4%, and more preferably 3%, 2%, or 1% in this order. In addition, the lower limit of the total content is preferably 0%. The total content may be 0%.

When the total content of Ti ions and W ions is set to the above-described content, glass capable of forming a light-shielding portion having excellent light-shielding properties and a light-transmitting portion having excellent light-transmitting properties with respect to visible light is obtained. On the other hand, when the total content is excessively large, there is a concern that a transmittance of light in a short-wavelength region (wavelength: 300 to 450 nm) may deteriorate in the light-transmitting portion.

In the oxide glass according to the first embodiment, a cation ratio of the content of $Li^+$ to a total content of $Li^+$, $Na^+$, and $K^+$ $[Li^+/(Li^++Na^++K^+)]$ is 0.5 or more. The lower limit of the cation ratio is preferably 0.7, and more preferably 0.8, 0.9, or 1 in this order. The cation ratio may be 1.

When the cation ratio $[Li^+/(Li^++Na^++K^+)]$ is set to the above-described range, glass that is capable of forming a light-shielding portion having excellent light-shielding properties and a light-transmitting portion having excellent light-transmitting properties with respect to visible light and has low specific gravity is obtained. On the other hand, when the cation ratio is excessively small, there is a concern that light-shielding properties in the light-shielding portion may deteriorate.

In the oxide glass according to the first embodiment, non-limiting examples of the content and the ratio of the glass components other than the above-described content and ratio will be described.

In the oxide glass according to the first embodiment, the upper limit of the content of $B^{3+}$ is preferably 20%, and more preferably 15%, 10%, or 8% in this order. In addition, the lower limit of the content of $B^{3+}$ is preferably 1%, and more preferably 3%, 5%, or 6% in this order. The content of $B^{3+}$ may be 0%.

$B^{3+}$ is the glass network forming component, and has an operation of improving meltability of glass. On the other hand, when the content of $B^{3+}$ is excessively large, chemical durability may tend to decrease. Accordingly, the content of $B^{3+}$ is preferably within the above-described range.

In the oxide glass according to the first embodiment, the upper limit of a cation ratio of the content of $B^{3+}$ to the content of $P^{5+}$ $[B^{3+}/P^{5+}]$ is preferably 0.5, and more preferably 0.45, 0.4, or 0.35 in this order. In addition, the lower limit of the cation ratio $[B^{3+}/P^{5+}]$ is preferably 0. The cation ratio $[B^{3+}/P^{5+}]$ may be 0.

In the oxide glass according to the first embodiment, the upper limit of the content of $Si^{4+}$ is preferably 10%, and more preferably 7%, 5%, 3%, 2%, or 1% in this order. In addition, the lower limit of the content of $Si^{4+}$ is preferably 0.1%, and more preferably 0.2%, 0.3%, 0.4%, or 0.5% in this order. The content of $Si^{4+}$ may be 0%.

$Si^{4+}$ is the glass network forming component, and has an operation of improving thermal stability, chemical durability, and weather resistance of glass. On the other hand, when the content of $Si^{4+}$ is excessively large, meltability of glass tends to deteriorate, and a glass raw material tends to remain in a non-molten state. Accordingly, the content of $Si^{4+}$ is preferably within the above-described range.

In the oxide glass according to the first embodiment, the upper limit of the content of $Al^{3+}$ is preferably 10%, and more preferably 7%, 5%, 3%, or 1% in this order. In addition, the lower limit of the content of $Al^{3+}$ is preferably 0%. The content of $Al^{3+}$ may be 0%.

$Al^{3+}$ has an operation of improving chemical durability, and weather resistance of glass. On the other hand, when the content of $Al^{3+}$ is excessively large, thermal stability of glass is likely to deteriorate, and a glass transition temperature Tg is likely to rise, and meltability is likely to deteriorate. Accordingly, the content of $Al^{3+}$ is preferably within the above-described range.

In the oxide glass according to the first embodiment, the lower limit of a total content of $P^{5+}$, $B^{3+}$, $Si^{4+}$, and $Al^{3+}$ [$P^{5+}+B^{3+}+Si^{4+}+Al^{3+}$] is preferably 29%, and more preferably 31%, 33%, or 34% in this order. In addition, the upper limit of the total content [$P^{5+}+B^{3+}+Si^{4+}+Al^{3+}$] is preferably 50%, and more preferably 44%, 41%, or 38% in this order.

In the oxide glass according to the first embodiment, the content of Ti ions is preferably small, and the upper limit is preferably as small as possible, is preferably 2.0%, and more preferably 1.5%, 1.0%, or 0.5%. The content of Ti ions may be 0%. Here, Ti ions may include Ti ions having different valance including $Ti^{4+}$ and $Ti^{3+}$.

As in Nb ions, W ions, and Bi ions, Ti ions greatly contribute to a high refractive index and have an operation of increasing coloration of glass. On the other hand, when the content of Ti ions is excessively large, there is a concern that a transmittance of light in a short-wavelength region (wavelength: 300 to 450 nm) may deteriorate in the light-transmitting portion. In addition, meltability of glass tends to deteriorate, and a glass raw material tends to remain in a non-molten state. Accordingly, the content of Ti ions is preferably within the above-described range.

In the oxide glass according to the first embodiment, the content of W ions is preferably small, and the upper limit is preferably as small as possible, is preferably 1.5% and more preferably 1.0% or 0.5%. The content of W ions may be 0%. W ions may include W ions having different valence including $W^{6+}$.

W ions contribute to a high refractive index, and have an operation of increasing coloration of glass. When the content of W ions is excessively large, there is a concern that a transmittance of light in a short-wavelength region (wavelength: 300 to 450 nm) may deteriorate in the light-transmitting portion. Accordingly, the content of W ions is preferably within the above-described range.

In the oxide glass according to the first embodiment, the lower limit of a total content of Ti ions, Nb ions, and W ions [Ti+Nb+W] is preferably 10%, and more preferably 11%, 12%, 14%, or 16% in this order. In addition, the upper limit of the total content [Ti+Nb+W] is preferably 21%, and more preferably 20%, 19.5%, 19%, or 18% in this order.

In the glass according to the first embodiment, the upper limit of a total content of Ti ions, Nb ions, W ions, and Bi ions [Ti+Nb+W+Bi] is preferably 11%, and more preferably 12%, 14%, or 16% in this order. In addition, the lower limit of the total content [Ti+Nb+W+Bi] is preferably 21.5%, and more preferably 20.5%, 20%, or 19% in this order.

In the oxide glass according to the first embodiment, the lower limit of a cation ratio of the total content of Ti ions, Nb ions, W ions, and Bi ions to the total content of $P^{5+}$, $B^{3+}$, and $Si^{4+}$ [(Ti+Nb+W+Bi)/($P^{5+}+B^{3+}+Si^{4+}$)] is preferably 0.36, and more preferably 0.38, 0.4, or 0.42 in this order. In addition, the upper limit of the cation ratio [(Ti+Nb+W+Bi)/($P^{5+}+B^{3+}+Si^{4+}$)] is preferably 0.8, and more preferably 0.75, 0.7, or 0.64 in this order.

In the oxide glass according to the first embodiment, the upper limit of the content of $Ta^{5+}$ is preferably 5%, and more preferably 3%, 2%, or 1% in this order. In addition, the lower limit of the content of $Ta^{5+}$ is preferably 0%. The content of $Ta^{5+}$ may be 0%.

$Ta^{5+}$ has an operation of improving thermal stability of glass. On the other hand, when the content of $Ta^{5+}$ is excessively large, the refractive index of glass tends to decrease, and meltability tends to decrease. Accordingly, the content of $Ta^{5+}$ is preferably within the above-described range.

In the oxide glass according to the first embodiment, the upper limit of the content $Na^+$ is preferably 7%, and more preferably 5%, 3%, or 1% in this order. In addition, the lower limit of the content of $Na^+$ is preferably 0%. The content of $Na^+$ may be 0%.

When glass contains $Na^+$, it is easy to perform chemical strengthening with respect to the glass. On the other hand, when the content of $Na^+$ is excessively large, there is a concern that thermal stability of the glass may deteriorate. If the content of $Na^+$ increases, it is necessary to reduce the content of $Li^+$ to maintain the thermal stability of the glass. As a result, there is a concern that it is difficult to form a light-shielding portion having excellent light-shielding properties and a light-transmitting portion having excellent light-transmitting properties with respect to visible light. Accordingly, the content of $Na^+$ is preferably within the above-described range.

In the oxide glass according to the first embodiment, the upper limit of a total content of $Li^+$ and $Na^+$ [$Li^++Na^+$] is preferably 60%, and more preferably 55%, 50%, or 47% in this order. In addition, the lower limit of the total content [$Li^++Na^+$] is preferably 20%, and more preferably 25%, 30%, 35%, or 40% in this order.

In the oxide glass according to the first embodiment, the upper limit of the content of $K^+$ is preferably 7%, and more preferably 5%, 3%, or 1% in this order. In addition, the lower limit of the content of $K^+$ is preferably 0%. The content of $K^+$ may be 0%.

$K^+$ has an operation of improving thermal stability of glass. On the other hand, when the content of $K^+$ is excessively large, the thermal stability tends to deteriorate. If the content of $K^+$ increases, it is necessary to reduce the content of $Li^+$ to maintain the thermal stability of the glass. As a result, there is a concern that it is difficult to form a light-shielding portion having excellent light-shielding properties and a light-transmitting portion having excellent light-transmitting properties with respect to visible light. Accordingly, the content of $K^+$ is preferably within the above-described range.

In the oxide glass according to the first embodiment, the upper limit of the content of $Rb^+$ is preferably 5%, and more preferably 3%, 1%, or 0.5% in this order. In addition, the lower limit of the content of $Rb^+$ is preferably 0%. The content of $Rb^+$ may be 0%.

In the oxide glass according to the first embodiment, the upper limit of the content of $Cs^+$ is preferably 5%, and more preferably 3%, 1%, or 0.5% in this order. In addition, the lower limit of the content of $Cs^+$ is preferably 0%. The content of $Cs^+$ may be 0%.

$Rb^+$ and $Cs^+$ have an operation of improving meltability of glass. On the other hand, when the contents are excessively large, there is a concern that the refractive index nd may decrease, and the volatility of a glass component during melting may increase. Accordingly, the content of each of $Rb^+$ and $Cs^+$ is preferably within the above-described range.

In the oxide glass according to the first embodiment, the upper limit of the content of $Mg^{2+}$ is preferably 15%, and more preferably 10%, 5%, 3%, or 1% in this order. In addition, the lower limit of the content of $Mg^{2+}$ is preferably 0%. The content of $Mg^{2+}$ may be 0%.

In the oxide glass according to the first embodiment, the upper limit of the content of $Ca^{2+}$ is preferably 15%, and more preferably 10%, 5%, 3%, or 1% in this order. In addition, the lower limit of the content of $Ca^{2+}$ is preferably 0%. The content of $Ca^{2+}$ may be 0%.

In the oxide glass according to the first embodiment, the upper limit of the content of $Sr^{2+}$ is preferably 15%, and more preferably 10%, 5%, 3%, or 1% in this order. In addition, the lower limit of the content of $Sr^{2+}$ is preferably 0%. The content of $Sr^{2+}$ may be 0%.

Any of $Mg^{2+}$, $Ca^{2+}$, and $Sr^{2+}$ has an operation of improving thermal stability and meltability of glass. On the other hand, when the contents are excessively large, there is a concern that high-refractive-index characteristics may be damaged, and thermal stability of glass may deteriorate. Accordingly, the contents of the glass components are preferably within the above-described ranges.

In the oxide glass according to the first embodiment, the upper limit of a total content of $Mg^{2+}$, $Ca^{2+}$, $Sr^{2+}$, and $Ba^{2+}$ [$Mg^{2+}+Ca^{2+}+Sr^{2+}+Ba^{2+}$] is preferably 30%, and more preferably 25%, 20%, 18%, 15%, 10%, or 5% in this order. In addition, the lower limit of the total content is preferably 0%. The total content may be 0%.

In the oxide glass according to the first embodiment, the upper limit of the content of $Zn^{2+}$ is preferably 8%, and more preferably 6%, 4%, or 2% in this order. In addition, the content of $Zn^{2+}$ is preferably small. The lower limit of the content is preferably 1%, and more preferably 0.8%, 0.6%, 0.4%, or 0% in this order. The content of $Zn^{2+}$ may be 0%.

$Zn^{2+}$ has an operation of improving thermal stability of glass. On the other hand, when the content of $Zn^{2+}$ is excessively large, there is a concern that meltability may deteriorate. Accordingly, the content of $Zn^{2+}$ is preferably within the above-described range.

In the oxide glass according to the first embodiment, the upper limit of the content of $Ga^{3+}$ is preferably 3%, and more preferably 2% or 1% in this order. In addition, the lower limit of the content of $Ga^{3+}$ is preferably 0%. The content of $Ga^{3+}$ may be 0%.

In the oxide glass according to the first embodiment, the upper limit of the content of $In^{3+}$ is preferably 3%, and more preferably 2% or 1% in this order. In addition, the lower limit of the content of $In^{3+0}$ is preferably 0%. The content of $In^{3+0}$ may be 0%.

In the oxide glass according to the first embodiment, the upper limit of the content of $Sc^{3+}$ is preferably 3%, and more preferably 2% or 1% in this order. In addition, the lower limit of the content of $Sc^{3+}$ is preferably 0%. The content of $Sc^{3+}$ may be 0%.

In the oxide glass according to the first embodiment, the upper limit of the content of $Hf^{4+}$ is preferably 3%, and more preferably 2% or 1% in this order. In addition, the lower limit of the content of $Hf^{4+}$ is preferably 0%. The content of $Hf^{4+}$ may be 0%.

In the oxide glass according to the first embodiment, the upper limit of the content of $Lu^{3+}$ is preferably 3%, and more preferably 2% or 1% in this order. In addition, the lower limit of the content of $Lu^{3+}$ is preferably 0%. The content of $Lu^{3+}$ may be 0%.

In the oxide glass according to the first embodiment, the upper limit of the content of $Ge^{4+}$ is preferably 3%, and more preferably 2% or 1% in this order. In addition, the lower limit of the content of $Ge^{4+}$ is preferably 0%. The content of $Ge^{4+}$ may be 0%.

In the oxide glass according to the first embodiment, the upper limit of the content of $La^{3+}$ is preferably 5%, and more preferably 4% or 3% in this order. The lower limit of the content of $La^{3+}$ is preferably 0%. The content of $La^{3+}$ may be 0%.

In the oxide glass according to the first embodiment, the upper limit of the content of $Gd^{3+}$ is preferably 5%, and more preferably 4% or 3% in this order. In addition, the lower limit of the content of $Gd^{3+}$ is preferably 0%. The content of $Gd^{3+}$ may be 0%.

In the oxide glass according to the first embodiment, the upper limit of the content of $Y^{3+}$ is preferably 5%, and more preferably 4% or 3% in this order. In addition, the lower limit of the content of $Y^{3+}$ is preferably 0%. The content of $Y^{3+}$ may be 0%.

In the oxide glass according to the first embodiment, the upper limit of the content of $Yb^{3+}$ is preferably 3%, and more preferably 2% or 1% in this order. In addition, the lower limit of the content of $Yb^{3+}$ is preferably 0%. The content of $Yb^{3+}$ may be 0%.

It is preferable that the cation components of the oxide glass according to the first embodiment mainly include the above-described components, that is, $P^{5+}$, Nb ions, $Li^+$, and Bi ions as essential components, and $Ba^{2+}$, $Zr^{4+}$, $B^{3+}$, $Si^{4+}$, $Al^{3+}$, Ti ions, W ions, $Ta^{5+}$, $Na^+$, $K^+$, $Rb^+$, $Cs^+$, $Mg^{2+}$, $Ca^{2+}$, $Sr^{2+}$, $Zn^{2+}$, $Ga^{3+}$, $In^{3+}$, $Sc^{3+}$, $Hf^{4+}$, $Lu^{3+}$, $Ge^{4+}$, $La^{3+}$, $Gd^{3+}$, $Y^{3+}$, and $Yb^{3+}$ as optional components. A total content of the above-described components is preferably 95% or more, more preferably 98% or more, still more preferably 99% or more, and still more preferably 99.5% or more.

Basically, the oxide glass according to the present embodiment is constituted by the above-described components, but may contain the other components within a range not deteriorating the effect and the operation of the present invention.

For example, the oxide glass according to the present embodiment may further contain an appropriate amount of copper (Cu) as a glass component so as to impart near-infrared light absorption characteristics to the glass. In addition, V, Cr, Mn, Fe, Co, Ni, Pr, Nd, Pm, Sm, Eu, Tb, Dy, Ho, Er, Tm, Ce, and the like may be contained. These elements may increase coloration of glass and can be a generation source of fluorescence.

In addition, in the present invention, inclusion of unavoidable impurities is not excluded.

<Other Component Composition>

Any of Pb, As, Cd, Ti, Be, and Se has toxicity. Therefore, it is preferable that the oxide glass according to the present embodiment does not contain these elements as a glass component.

Any of U, Th, and Ra is a radioactive element. Therefore, it is preferable that the oxide glass according to the present embodiment does not contain these elements as a glass component.

$Sb^{3+}$, $Sn^{4+}$, and $Ce^{4+}$ are optionally additive glass components functioning as a clarifying agent. Among these, $Sb^{3+}$ is a clarifying agent having a large clarifying effect.

The content of $Sb^{3+}$ is expressed as mass % in outer percentage when converted into $Sb_2O_3$. Here, the content of $Sb^{3+}$ is expressed as the content of $Sb_2O_3$ in mass % in terms of outer percentage when content ratios of cation components other than $Sb^{3+}$, $Sn^{4+}$, and $Ce^{4+}$ are converted into oxides such as $Sb_2O_3$ and a total content ratio of all cation components other than $Sb^{3+}$, $Sn^{4+}$, and $Ce^{4+}$ is set to 100 mass %. The content of $Sb_2O_3$ is preferably less than 2 mass %, more preferably less than 1 mass %, still more preferably less than 0.5 mass %, still more preferably less than 0.2 mass %, still more preferably less than 0.1 mass %, and still more preferably less than 0.05 mass %. When the content of $Sb_2O_3$ is set within the above-described range, clarity of glass can be improved.

The content of each of $Sn^{4+}$ and $Ce^{4+}$ is also expressed in outer percentage when converted into an oxide. That is, the content of each of $Sn^{4+}$ and $Ce^{4+}$ is expressed as the content of $SnO_2$ and the content of $CeO_2$ in mass % in terms of outer percentage when content ratios of cation components other than $Sb^{3+}$, $Sn^{4+}$, and $Ce^{4+}$ are converted into content ratios in terms of oxides and a total content ratio of all cation components other than $Sb^{3+}$, $Sn^{4+}$, and $Ce^{4+}$ is set to 100 mass %. The content of each of $SnO_2$ and $CeO_2$ is preferably less than 2 mass %, more preferably less than 1 mass %, still more preferably less than 0.5 mass %, and still more preferably less than 0.1 mass %. The content of each of $SnO_2$ and $CeO_2$ may be 0 mass %. When the content of each of $SnO_2$ and $CeO_2$ is set within the above-described range, clarity of glass can be improved.

<Glass Characteristics>

(Refractive Index nd)

In the oxide glass according to the first embodiment, the lower limit of a refractive index nd is preferably 1.68, and may also be set to 1.70, 1.72, or 1.73. The upper limit of the refractive index nd is not particularly limited, but the upper limit is typically 1.78 and is preferably 1.76.

(Abbe's Number vd)

In the oxide glass according to the first embodiment, the lower limit of the Abbe's number vd is preferably 24, and may also be set to 25, 26, 28, or 29. The upper limit of the Abbe's number vd is not particularly limited, but the upper limit is typically 35, and is preferably 32.

(Glass Transition Temperature Tg)

In the oxide glass according to the first embodiment, the upper limit of a glass transition temperature Tg is preferably 530° C., and more preferably 500° C., 480° C., or 460° C. in this order. In addition, the lower limit of the glass transition temperature Tg is not particularly limited, but the lower limit is typically 400° C., and preferably 440° C.

(Sag Temperature Ts)

In the oxide glass according to the first embodiment, the upper limit of a sag temperature Ts is preferably 600° C., and more preferably 570° C., 550° C., or 530° C. in this order. In addition, the lower limit of the sag temperature Ts is not particularly limited, but the lower limit is typically 400° C., and is preferably 460° C.

(Specific Gravity)

In the oxide glass according to the first embodiment, specific gravity is preferably 3.5 or less, and more preferably 3.4 or less, 3.3 or less, or 3.2 or less in this order.

(Internal Transmittance)

In the oxide glass according to the first embodiment, an internal transmittance at a wavelength of 380 nm in terms of a thickness of 1.0 mm is preferably 96% or more, and more preferably 96.5% or more, 97% or more, or 98% or more in this order. In addition, a minimum value of the internal transmittance of light in a wavelength range of 380 to 1100 nm is preferably 97% or more in terms of a thickness of 1.0 mm, and more preferably 98% or more, 99% or more, or 99.5% or more in this order.

In the present embodiment, a spectral transmittance is measured by using glass samples having a thickness of 2.0 mm±0.1 mm and 10.0 mm±0.1 mm in conformity to JOGIS17 (method of measuring an internal transmittance of optical glass), and a value in terms of a thickness of 1.0 mm is set as the internal transmittance.

<Manufacture of Glass>

The oxide glass according to the first embodiment may be prepared by a known glass manufacturing method. For example, a plurality of kinds of compounds are combined and sufficiently mixed to obtain a batch raw material, and the batch raw material is put into a melting container and is melted, clarified, and homogenized. Then, molten glass is molded and slowly cooled to obtain glass. Alternatively, the batch raw material is put into the melting container and roughly melted (rough melting). The melt obtained by the rough melting is rapidly cooled and pulverized to prepare a cullet. Subsequently, the cullet may be put into the melting container and may be heated and remelted to obtain molten glass, and the molten glass may be molded after being clarified and homogenized, and may be slowly cooled to obtain glass. A known method may be applied to the molding and slow cooling of the molten glass.

Furthermore, a process of increasing the amount of moisture in the molten glass may be included in a process of manufacturing the oxide glass according to the present embodiment. Examples of the process of increasing the amount of moisture in the molten glass include a process of adding water vapor to the atmosphere in melting and a process of bubbling a gas containing water vapor in the molten glass. Among these, it is preferable to include the process of adding water vapor to the atmosphere in melting. When including the process of increasing the amount of moisture in the molten glass, a βOH value of glass can be increased. When increasing the βOH value, glass having high transparency can be obtained.

A light-shielding portion can be formed in the manufactured glass by a method to be described later.

The oxide glass according to the present embodiment can be used an optical element. From the viewpoint of being used as the optical element, it is preferable that the oxide glass according to the present embodiment is optical glass. However, the oxide glass according to the present embodiment can be used as a decorative material, an exterior of a small-sized electronic device, or the like by taking advantage of decorativeness of a light-shielding portion, and thus there is no limitation to the optical glass.

<Manufacture of Optical Element or the Like>

An optical element comprising the oxide glass according to the present embodiment may be prepared by a known manufacturing method. For example, molten glass is poured into a mold and is molded into a plate shape to prepare a glass material. The obtained glass material is appropriately cut, ground, and polished to prepare a cut piece having a size and a shape which are suitable for press forming. The cut piece is heated and softened, and is press formed (reheat-pressed) by a known method to prepare an optical element blank that approximates a shape of the optical element. The optical element blank is annealed and is grounded and polished by a known method to prepare an optical element.

A light-shielding portion can be formed in the prepared optical element by a method to be described later. In addition, the light-shielding portion may also be formed during a step of preparing the optical element.

An optical functional surface of the prepared optical element may be coated with an antireflection film, a total reflection film, or the like in correspondence with the purpose of use.

According to an aspect of the present invention, an optical element comprising the oxide glass can be provided. Examples of the kind of the optical element include a lens such as a spherical lens and an aspherical lens, a prism, and the like. Examples of a shape of the lens include various shapes such as a biconvex lens, a plano-convex lens, a biconcave lens, a plano-concave lens, a convex meniscus lens, and a concave meniscus lens. The optical element can be manufactured by a method including a process of processing a glass molded body comprising the above-described oxide glass. Examples of the processing include severance, cutting, rough grinding, fine grinding, polishing, and the like.

In addition, as an example of the optical element, an optical element configured to shield light diagonally incident on a light-receiving surface of an image sensor such as a CCD and a CMOS sensor can be exemplified. Specifically, cover glass configured to shield light diagonally incident on a light-receiving surface of an image sensor can be exemplified.

Furthermore, according to the aspect of the present invention, the glass can be used as a decorative material, an exterior of a small-sized electronic device, or the like by taking advantage of decorativeness of the light-shielding portion to be described later.

<Formation of Light-Shielding Portion>

A light-shielding portion having an arbitrary shape can be formed in the oxide glass and the optical element according to the first embodiment. The light-shielding portion is a portion where glass itself is colored, and is preferably formed in a layer shape from a glass surface to an inner side. In addition, in the light-shielding portion, a transmittance of visible light is reduced due to coloration. In addition, a portion where the light-shielding portion is not formed, that is, a non-colored portion that is not colored becomes a light-transmitting portion. That is, in the oxide glass and the optical element according to the present embodiment, the light-transmitting portion that is not colored, and the light-shielding portion in which a transmittance for visible light is smaller in comparison to the light-transmitting portion can be integrally formed, and as to be described later, the glass can be used as an optical element having a function of the cover glass.

The light-shielding portion can be formed by a process of forming a metal film having an arbitrary shape on a glass surface, and a process of performing a heat treatment in a reducing atmosphere.

As a metal that constitutes the metal film, a metal having an operation of occluding hydrogen ions in the atmosphere and reducing a glass component contained in glass through exchange of hydrogen ions and electrons is preferable. A metal having an operation of reducing a transition metal among glass components is more preferable. Specific examples include Ni, Au, Ag, Pt, Pd, and alloys such as a Pt—Pd alloy that includes these metals.

When forming the light-shielding portion, metal paste including a metal that constitutes the metal film described above may be used. In addition, a method of forming the metal film on the glass surface is not particularly limited as long as the metal film can be brought into close contact with the glass surface, and examples thereof include vapor deposition, sputtering, plating, screen printing, coating, and the like.

The reducing atmosphere may contain a gas having reducing power. Examples of the gas having reducing power include hydrogen. Accordingly, it is preferable to use a hydrogen-containing gas as the reducing atmosphere, and a forming gas containing hydrogen may be used. The forming gas is a mixed gas of hydrogen and nitrogen, and typically contains approximately 3 to 5 volume % of hydrogen.

The heat treatment is performed at a temperature equal to or higher than a temperature which is lower than the glass transition temperature Tg by 200° C. (Tg-200), and equal to or lower than the softening point temperature. A heat treatment time can be appropriately adjusted in accordance with a target degree of coloration, a range of the light-shielding portion, the thickness of the light-shielding portion, or the like.

After the heat treatment, the metal film is peeled off from the glass surface. A peeling method is not particularly limited, and examples thereof include a removal method through polishing or dissolution in an acidic liquid, and the like.

The light-shielding portion is formed from the glass surface that is in contact with the metal film to the inside due to the heat treatment in the reducing atmosphere.

A mechanism in which the light-shielding portion is formed by the above-described method is not particularly limited, and is considered as follows.

Coloration of the light-shielding portion formed in the present embodiment is considered as a reducing color caused by a glass component, and particularly as a reducing color caused by a transition metal. Typically, even when a glass molded body is subjected to a heat treatment in an atmosphere containing hydrogen in a low concentration of approximately 3 to 5 volume %, the glass hardly shows a reducing color. However, since the metal film occludes hydrogen ions in the atmosphere, a lot of hydrogen ions are supplied to a portion of the glass which is in contact with the metal film in comparison to a portion that is not in contact with the metal film, and as a result, a reducing reaction proceeds rapidly. Accordingly, the portion of the glass which is in contact with the metal film is deeply colored. Since the amount of hydrogen ions occluded by the metal film is large, the concentration of hydrogen in the atmosphere may decrease due to occlusion by the metal film. For this reason, in the portion that is not in contact with the metal film, the reducing reaction is less likely to proceed.

That is, coloration of the light-shielding portion is preferably the reducing color caused by the glass component as described above, and more preferably the reducing color caused by the transition metal. Examples of the transition metal include Ti, Nb, W, and Bi.

In the oxide glass and the optical element according to the present embodiment, as described above, since the light-shielding portion is a portion where the glass itself is colored, the light-transmitting portion and the light-shielding portion have the same glass composition. However, in the light-transmitting portion and the light-shielding portion, the valence of the glass component (cation) may be different. In addition, in the present invention, "the same glass composition" represents that composition analysis results match each other within an error range.

Here, the reducing reaction of the glass component which is the main cause for coloration proceeds to all directions from the portion that is in contact with the metal film. That is, in observation from a cross-section of the glass, the light-shielding portion is formed from the glass surface that is in contact with the metal film in the thickness direction, and in observation from the glass surface, the colored layer is radially formed from the portion that is in contact with the metal film.

According to the above-described method, a more deeply colored light-shielding portion can be formed. Accordingly, even when the thickness of the light-shielding portion is small, a transmittance can be sufficiently reduced. In a case where the thickness of the light-shielding portion is small, a range of the light-shielding portion that is observed from the glass surface and is radially formed from the portion that is in contact with the metal film also decreases. That is, according to the present embodiment, when adjusting formation conditions of the light-shielding portion, in the case of observation from the glass surface, a light-shielding portion having approximately the same shape as that of the metal film can be formed.

In the oxide glass and the optical element according to the present embodiment, a maximum value of an external transmittance of visible light (light in a wavelength range of 380 to 1100 nm) in the light-shielding portion is preferably 20% or less in terms of a thickness of 1.0 mm, and more preferably 15% or less, 8% or less, or 5% or less in this order.

The external transmittance is a value in which a ratio of transmitted light intensity I transmitted through glass to incident light intensity $I_0$ incident on the glass ($I/I_0$) is expressed as percentage, that is, a transmittance in which surface reflectance on a surface of the glass is also considered. The external transmittance is obtained by measuring a transmission spectrum by using a spectrophotometer. In the present embodiment, a value in terms of a thickness of 1.0 mm is set as the external transmittance.

In the oxide glass and the optical element according to the present embodiment, an optical density OD of the light-shielding portion at a wavelength of 1100 nm is preferably 0.5 or more, and more preferably 0.8 or more, 1.0 or more, or 1.3 or more in this order.

As expressed by the following Expression, the optical density (OD) is expressed as a numerical value obtained by applying a negative sign (minus) to a common logarithm of the ratio of the incident light intensity $I_0$ and the transmitted light intensity I.

$$OD = -\log_{10}(I/I_0)$$

In the oxide glass and the optical element according to the first embodiment, OD of the light-shielding portion is large, and OD of the light-transmitting portion is small. In measurement of OD, in a case where measurement light passes through both the light-shielding portion and the light-transmitting portion, since OD of the light-transmitting portion is sufficiently small, OD of the light-shielding portion becomes dominant.

In addition, in the oxide glass and the optical element which include two opposing surfaces, OD in a case of providing light-shielding portions having the same thickness and the same degree of coloration in both the surfaces becomes approximately two times OD in a case of providing the same light-shielding portion only in a single surface.

In addition, in the oxide glass and the optical element according to the present embodiment, in a wavelength region from a visible region to a near-infrared region, OD decreases along with an increase in a wavelength. Accordingly, in the light-shielding portion, for example, OD at a wavelength of 780 nm becomes larger than OD at a wavelength of 1100 nm.

Accordingly, in a case where a wavelength region desired to be shielded exists, OD at a wavelength on a long wavelength side in the wavelength region is designed to be high enough to secure the light-shielding properties over the entire wavelength region desired. In the case of designing glass that shields only visible light, OD may be set to be high enough on a long wavelength side (for example, 780 nm) of the visible region. In addition, in the case of designing glass that shields light from the visible region to the near infrared region, OD may be set to be high enough at a wavelength in the near infrared region (for example, a wavelength of 1100 nm). OD can be controlled by adjusting the thickness of the light-shielding portion or the degree of coloration in the light-shielding portion.

In the oxide glass and the optical element according to the present embodiment, in one or more surfaces, the light-shielding portion may be provided in the entirety of the surfaces, or a light-shielding portion patterned into an arbitrary shape may be provided. In the case of patterning, for example, shapes such as a pattern, a character, a digit, a figure, a design, and an identification code may be employed, or a shape drawn by a straight line or a curved line may be employed. According to the above-described method, in the oxide glass and the optical element according to the present embodiment, contrast between the light-shielding portion and the light-transmitting portion that is not colored becomes clear, and thus a light-shielding portion patterned into an arbitrary shape can be formed.

The oxide glass and the optical element according to the present embodiment may have a plate shape, may include a light-shielding portion having an arbitrary shape in a single surface or both surfaces, may include a light-shielding portion that is provided in the entirety of a single surface or both surfaces, and may include a light-shielding portion that is patterned into an arbitrary shape in a single surface or both surfaces. The thickness of the glass is not particularly limited. However, in a case of forming the light-shielding portion on both surfaces of the glass, when the thickness of the glass is small, a light-shielding portion provided in one surface and a light-shielding portion provided in the other surface may overlap in a thickness direction. In this case, the light-shielding portion may be formed to penetrate in a thickness direction of the glass.

In addition, in glass having a small thickness, deformation such as warpage may occur due to formation of the light-shielding portion. The cause is not particularly limited, but it is considered that the deformation is caused by occurrence of an arbitrary stress in the glass due to formation of the light-shielding portion. In a case where warpage occurs due to the light-shielding portion provided only in a single surface of glass, a stress that occurs in the glass can be canceled by providing the light-shielding portion in both surfaces of the glass. A shape of the light-shielding portion is not particularly limited. Warpage or deformation caused by formation of the light-shielding portion is likely to occur in a case where the thickness of the glass is 1 mm or less.

The oxide glass and the optical element according to the present embodiment may have a plate shape, and may include a light-shielding portion in a first main surface and a second main surface. In a plan view, the light-shielding portion in the first main surface may be formed so as not to overlap the light-shielding portion in the second main surface. When providing the light-shielding portion in this manner, warpage or deformation of the glass which occurs due to formation of the light-shielding portion can be reduced. For example, as illustrated in FIG. 1, when providing light-shielding portions at positions different from each other in the first main surface and the second main surface, warpage or deformation of the glass can be reduced.

Figure 2:
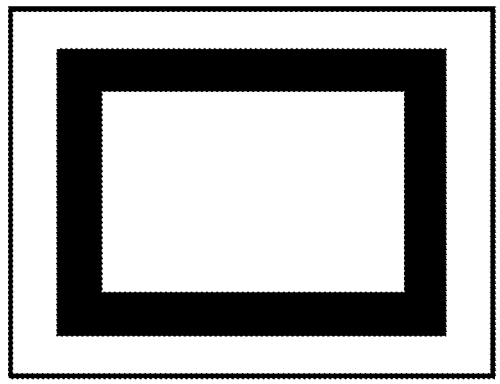
FIG. 2 is a schematic view illustrating an example of the embodiment of the present invention.
Figure 2:
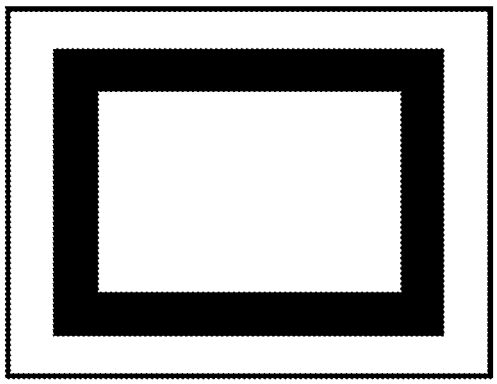

In addition, the oxide glass and the optical element according to the present embodiment may have a plate shape, and may include a light-shielding portion in the first main surface and the second main surface. In a plan view, a part or the entirety of the light-shielding portion in the first main surface may be formed to overlap a part or the entirety of the light-shielding portion in the second main surface. According to this, warpage or deformation of glass can be reduced. For example, as illustrated in FIG. 2, in glass having a plate shape, light-shielding portions having the same shape can be formed in the first main surface and the second main surface of the glass at the same position in a plan view. In this case, in each of the light-shielding portions formed in the first main surface and the second main surface, even when the degree of coloration is small, since a light-shielding portion in the first main surface and a light-shielding portion in the second main surface appear to overlap each other in a plan view, so that the light-shielding portions appears to be deeply colored. In a case where the degree of coloration is small, the degree of warpage or deformation is also small. In addition, in a case where the degree of coloration may be small, the heat treatment time in the reducing atmosphere described above can be shortened. When the heat treatment time in the reducing atmosphere is shortened, a transmittance in a light-transmitting portion (non-colored portion) other than the light-shielding portion can be maintained to be high. As a result, contrast between the light-shielding portion and the light-transmitting portion in a plan view can be made further clear.

The oxide glass and the optical element according to the present embodiment may have a plate shape, and in a plan view, a central portion may be set as a light-transmitting portion (non-colored portion), and a light-shielding portion may be provided to surround the light-transmitting portion. The glass can be used as an optical element having a function of cover glass.

The cover glass is an optical element that is disposed on a front surface of a solid-state imaging element as disclosed in Patent Document (Japanese Unexamined Patent Publication No. 2015-179788). Particularly, the cover glass is attached to a front surface of a package that accommodates the solid-state imaging element, and protects the solid-state imaging element and is used as a light-transmitting window. In recently, an imaging module equipped with a solid-state imaging element such as CCD and CMOS is used in a portable telephone, a portable information terminal, and the like. The imaging module includes a box-shaped package that accommodates the solid-state imaging element and is formed from ceramic or a resin, and cover glass that is fixed to a peripheral edge portion of the package with an ultraviolet curable resin and seals the solid-state imaging element.

As described above, the oxide glass and the optical element according to the present embodiment can be integrally provided with the light-transmitting portion and the light-shielding portion. In a case of using the oxide glass and the optical element according to the present embodiment as the cover glass, occurrence of flare, ghost, or the like caused by light reflected from a side surface of the cover glass or the like can be suppressed due to the light-shielding portion.

In the oxide glass and the optical element according to the present embodiment, since the light-shielding portion can be formed from a surface of glass to the inside thereof, the light-shielding portion and the light-transmitting portion have the same glass composition, and thus the light-shielding portion and the light-transmitting portion can be provided in one piece of glass without being joined. In addition, in the present embodiment, the light-shielding portion can have sufficient light-shielding properties, and the light-transmitting portion can have sufficient light-transmitting properties. Furthermore, in the present embodiment, the light-shielding portion having an arbitrary shape can be formed, and contrast between the light-shielding portion and the light-transmitting portion can be clear, and thus the shape of the light-shielding portion can be controlled with high accuracy. In addition, in the glass according to the present embodiment, since the light-shielding portion and the light-transmitting portion have substantially the same refractive index, in a case of being used as cover glass, interface reflection between the light-shielding portion and the light-transmitting portion is suppressed, and stray light can be effectively suppressed.

The oxide glass and the optical element according to the present embodiment may have a plate shape, and in a plan view, a central portion may be the light-shielding portion, the light-shielding portion may be provided to surround the light-transmitting portion, and an edge portion of the glass may be the light-transmitting portion. The light-shielding portion can be formed on a single surface or both surfaces. This kind of glass can be used as an optical element having a function of cover glass. In addition, in a case of being used as the cover glass, occurrence of flare, ghost, or the like caused by light reflected from a side surface of the cover glass or the like can be suppressed due to the light-shielding portion. Specifically, glass including a light-shielding portion as illustrated in FIG. 2 can be exemplified.

The light-transmitting portion allows more sufficient light to be transmitted therethrough in comparison to the light-shielding portion. Accordingly, a photocurable resin such as ultraviolet curable adhesive can be polymerized and cured by transmitting light from the light-transmitting portion. That is, when a portion in which the photocurable resin is used is set as the light-transmitting portion, bonding by the photocurable resin becomes possible. In a case where an edge portion of glass is set as the light-transmitting portion, light can be transmitted from the edge portion. Accordingly, in a case of using the glass as cover glass, the glass itself or another imaging element can be fixed with the photocurable resin or the like by transmitting light from the edge portion.

Here, in the oxide glass and the optical element according to the present embodiment, as described above, a glass surface that comes into contact with a metal film can be selectively colored through a heat treatment in a reducing atmosphere, but a glass surface that does not come into contact with the metal film may be slightly colored. However, when shortening a heat treatment time in the reducing atmosphere, coloration in a portion in which coloration is desired to be suppressed, for example, a portion desired to be set as the light-transmitting portion can be reduced. For example, as illustrated in FIG. 2, in plate-shaped glass, in a case of forming the light-shielding portion in the first main surface and the second main surface of the glass, when the heat treatment time is halved, an optical density (OD) of the light-shielding portion of each of the first main surface and the second main surface becomes approximately the half. However, when forming the light-shielding portion in the first main surface and the second main surface of the glass in the same shape and at the same position in a plan view, the sum of OD of the light-shielding portion of the first main surface and OD of the light-shielding portion of the second main surface can be set as OD of the light-shielding portions. In addition, in the light-transmitting portion, when the heat treatment time in the reducing atmosphere is halved, coloration due to the heat treatment is halved and sufficiently reduced. As a result, the light-shielding portion can secure sufficient light-shielding properties, and the light-transmitting portion can secure sufficient light-transmitting properties. Note that, in a range in which securement of the light-transmitting properties in the light-transmitting portion and securement of the light-shielding properties in the light-shielding portion can be compatible with each other, the light-shielding portion of the first main surface and the light-shielding portion of the second main surface may not have strictly the same shape, and positions of the two light-shielding portions in a plan view may not be strictly the same as each other.

The oxide glass and the optical element according to the present embodiment may have a plate shape, and may include a light-shielding portion having an arbitrary shape in a side surface. The oxide glass and the optical element according to the present embodiment may include a light-shielding portion in the entirety of a side surface, or a light-shielding portion that is patterned into an arbitrary shape in a side surface. Accordingly, in a case of using the oxide glass and the optical element according to the present embodiment as cover glass, when providing the light-shielding portion having an arbitrary shape in the side surface, stray light from a side surface of a lead frame or the like in the vicinity of a solid-state imaging element can be suppressed.

As described above, since the oxide glass and the optical element according to the present embodiment has a plate shape, and include the light-shielding portion in the first main surface and the second main surface, in a case of being used as cover glass, stray light from a front surface of the cover glass can be prevented. Furthermore, the oxide glass and the optical element according to the present embodiment may have a plate shape and may include a light-shielding portion having an arbitrary shape in the first main surface, the second main surface, and a side surface. When using the glass as the cover glass, stray light that occurs on the front surface and the side surface can be suppressed.

In the oxide glass and the optical element according to the present embodiment, the thickness of the glass is not particularly limited in a case of plate shape, but the thickness may be 1 mm or less, 0.7 mm or less, or 0.5 mm or less. Since the oxide glass and the optical element according to the present embodiment have a plate shape having a thickness in the above-described range, and the light-shielding portion is appropriately disposed as described above, application as an optical element having a function of cover glass is possible.

Note that, the thickness of the light-shielding portion in a cross-section of the glass is not particularly limited, but the thickness is preferably 1 to 300 µm, more preferably 20 to 200 µm, and still more preferably 30 to 150 µm.

Second Embodiment

An optical element according to a second embodiment integrally includes:
a light-transmitting portion; and
a light-shielding portion in which a transmittance of visible light is smaller in comparison to the light-transmitting portion,
wherein the optical element comprises oxide glass containing $P^{5+}$, Nb ions, Bi ions, and $Li^+$ as a glass component, and
the oxide glass satisfies at least one of the following conditions (i) and (ii),
(i) a total content of Nb ions and $Li^+$ is 50% or more, and
(ii) a cation ratio of the content of $Li^+$ to a total content of $Li^+$, $Na^+$, and $K^+[Li^+/(Li^++Na^++K^+)]$ is 0.5 or more.

The optical element according to the second embodiment integrally includes the light-transmitting portion and the light-shielding portion in which a transmittance of visible light is smaller in comparison to the light-transmitting portion. The visible light is light in a wavelength range of 380 to 1100 nm. That is, in the light-transmitting portion, a minimum value of an internal transmittance of light in a wavelength range of 380 to 1100 nm is preferably 96% or more in terms of a thickness of 1.0 mm, and more preferably 96.5% or more, 97% or more, or 98% or more in this order. In the light-shielding portion, a maximum value of an external transmittance of light in a wavelength range of 380 to 1100 nm is preferably 20% or less in terms of a thickness of 1.0 mm, and more preferably 15% or less, 8% or less, or 5% or less in this order.

Note that, in the present embodiment, a spectral transmittance in a wavelength range of 380 to 1100 nm is measured by using glass samples having a thickness of 2.0 mm±0.1 mm and 10.0 mm±0.1 mm in conformity to JOGIS17 (method of measuring an internal transmittance of optical glass), and a value in terms of a thickness of 1.0 mm is set as the internal transmittance.

The external transmittance is a value in which a ratio of transmitted light intensity I transmitted through glass to incident light intensity $I_0$ incident to the glass ($I/I_0$) is expressed as percentage, that is, a transmittance in which surface reflectance on a surface of the glass is also considered. The external transmittance is obtained by measuring a transmission spectrum by using a spectrophotometer. In the present embodiment, a value in terms of a thickness of 1.0 mm is set as the external transmittance.

In addition, the optical element according to the second embodiment integrally includes the light-transmitting portion and the light-shielding portion. Specifically, the light-shielding portion is a portion where glass itself is colored, and is preferably formed in a layer shape from a glass surface to an inner side. In addition, a portion where the light-shielding portion is not formed, that is, a non-colored portion that is not colored becomes a light-transmitting portion. As described above, since the light-shielding portion is a portion where glass itself is colored, the light-transmitting portion and the light-shielding portion have the same glass composition. However, in the light-transmitting portion and the light-shielding portion, the valence of the glass component (cation) may be different. In addition, in the present invention, "the same glass composition" represents that composition analysis results match each other within an error range. A method of forming the light-shielding portion can be similar as in the first embodiment. In addition, a shape of the light-shielding portion and characteristics other than the above-described characteristics can be similar as in the first embodiment.

The optical element according to the second embodiment comprises oxide glass containing $P^{5+}$, Nb ions, Bi ions, and $Li^+$ as a glass component. In the present invention, the oxide glass represents glass that contains $O^{2-}$ as an anion component, and the content of $O^{2-}$ is 80 anion % or more.

In the second embodiment, the lower limit of the content of $P^{5+}$ in the oxide glass is preferably 7%, and more preferably 10%, 15%, 22%, or 27% in this order. In addition, the upper limit of the content of $P^{5+}$ is preferably 43%, and more preferably 40%, 37%, 34%, or 32% in this order.

$P^{5+}$ is a glass network forming component. From the viewpoint of obtaining glass that is capable of forming a light-shielding portion having excellent light-shielding properties and a light-transmitting portion having excellent light-transmitting properties with respect to visible light and has low specific gravity, the content of $P^{5+}$ is preferably set to the above-described range. On the other hand, when the content of $P^{5+}$ is excessively large, there is a concern that chemical durability deteriorates, and meltability also deteriorates.

In the second embodiment, the lower limit of the content of Nb ions in the oxide glass is preferably 10%, and more preferably 11%, 12%, 14%, or 16% in this order. In addition, the upper limit of the content of Nb ions is preferably 21%, and more preferably 20%, 19.5%, 19%, or 18% in this order. Nb ions may include Nb ions having different valence including $Nb^{5+}$.

Nb ions are a component that contributes to a high refractive index and increases coloration of glass. In addition, Nb ions have an operation of improving thermal stability and chemical durability of glass. From the viewpoint of obtaining glass capable of forming a light-shielding portion having excellent light-shielding properties and a light-transmitting portion having excellent light-transmitting properties with respect to visible light, the content of Nb ions is set to the above-described range. On the other hand, when the content of Nb ions is excessively large, there is a concern that devitrification resistance of glass may deteriorate, and a transmittance of light in a short-wavelength region (wavelength: 300 to 450 nm) may deteriorate in the light-transmitting portion.

In the second embodiment, the content of Bi ions in the oxide glass is preferably more than 0%, and the lower limit of the content is preferably 0.2%, and more preferably 0.3%, 0.4%, or 0.5% in this order. In addition, the upper limit of the content of Bi ions is preferably 6%, and more preferably 5%, 4%, 2%, or 1% in this order. Bi ions may include Bi ions having different valance including $Bi^{3+}$.

Bi ions contribute a high refractive index and have an operation of increasing coloration of glass. From the viewpoint of obtaining glass that is capable of forming a light-shielding portion having excellent light-shielding properties and a light-transmitting portion having excellent light-transmitting properties with respect to visible light, the content of Bi ions is preferably set to the above-described range. On the other hand, when the content of Bi ions is excessively large, there is a concern that a transmittance of light in a short-wavelength region (wavelength: 300 to 450 nm) may deteriorate in the light-transmitting portion. In addition, the content of Bi ions is excessively small, there is a concern that light-shielding properties in the light-shielding portion may deteriorate.

In the second embodiment, the lower limit of the content of $Li^+$ in the oxide glass is preferably 20%, and more preferably 25%, 30%, 35%, or 40% in this order. In addition, the upper limit of the content of $Li^+$ is preferably 60%, and more preferably 55%, 50%, or 47% in this order.

From the viewpoint of obtaining glass that is capable of forming a light-shielding portion having excellent light-shielding properties and a light-transmitting portion having excellent light-transmitting properties with respect to visible light and has low specific gravity, the content of $Li^+$ is preferably set to the above-described range. In addition, it is easy to perform chemical strengthening with respect to glass. On the other hand, when the content of $Li^+$ is excessively large, there is a concern that thermal stability of glass may deteriorate.

In addition, in the second embodiment, the oxide glass satisfies at least one of the following conditions (i) and (ii).

(i) A total content of Nb ions and $Li^+$ is 50% or more.

(ii) A cation ratio of the content of $Li^+$ to a total content of $Li^+$, $Na^+$, and $K^+$ [$Li^+/(Li^++Na^++K^+)$] is 0.5 or more.

(i) In the second embodiment, the lower limit of the total content of Nb ions and $Li^+$ in the oxide glass is preferably 50%, and more preferably 52%, 54%, or 57% in this order. In addition, the upper limit of the total content is preferably 75%, and more preferably 70%, 66%, or 63% in this order.

From the viewpoint of obtaining glass that is capable of forming a light-shielding portion having excellent light-shielding properties and a light-transmitting portion having excellent light-transmitting properties with respect to visible light and has low specific gravity, the total content of Nb ions and $Li^+$ is preferably set to the above-described range. On the other hand, when the total content is excessively small, there is a concern that the light-shielding properties in the light-shielding portion may deteriorate.

(ii) In the second embodiment, the lower limit of a cation ratio of the content of $Li^+$ to a total content of $Li^+$, $Na^+$, and $K^+$ [$Li^+/(Li^++Na^++K^+)$] in the oxide glass is preferably 0.5, and more preferably 0.7, 0.8, 0.9, or 1 in this order. The cation ratio may be 1.

From the viewpoint of obtaining glass that is capable of forming a light-shielding portion having excellent light-shielding properties and a light-transmitting portion having excellent light-transmitting properties with respect to visible light and has low specific gravity, the cation ratio [$Li^+/(Li^++Na^++K^+)$] is preferably set to the above-described range. On the other hand, when the cation ratio is excessively small, there is a concern that light-shielding properties in the light-shielding portion may deteriorate.

In the second embodiment, the upper limit of the content of $Ba^{2+}$ in the oxide glass is preferably 5%, and more preferably 4%, 3%, 2%, or 1% in this order. In addition, the lower limit of the content of $Ba^{2+}$ is preferably 0%. The content of $Ba^{2+}$ may be 0%.

$Ba^{2+}$ has an operation of improving thermal stability and meltability of glass. From the viewpoint of obtaining glass having low specific gravity, the content of $Ba^{2+}$ is preferably set to the above-described range. On the other hand, when the content of $Ba^{2+}$ is excessively large, there is a concern that the specific gravity may increase, and devitrification resistance may deteriorate. Furthermore, there is a concern that the thermal stability of glass may deteriorate.

In the second embodiment, the upper limit of the content of $Zr^{4+}$ in the oxide glass is preferably 2%, and more preferably 1.5%, 1%, or 0.5% in this order. In addition, the lower limit of the content of $Zr^{4+}$ is preferably 0%. The content of $Zr^{4+}$ may be 0%.

$Zr^{4+}$ has an operation of improving the thermal stability of glass. From the viewpoint of obtaining glass that is capable of forming a light-shielding portion having excellent light-shielding properties and a light-transmitting portion having excellent light-transmitting properties with respect to visible light and has low specific gravity, the content of $Zr^{4+}$ is preferably set to the above-described range. On the other hand, when the content of $Zr^{4+}$ is excessively large, the thermal stability and the meltability of glass tend to deteriorate.

In the second embodiment, the upper limit of the total content of Ti ions and W ions in the oxide glass is preferably 5%, and more preferably 4%, 3%, 2%, or 1% in this order.

In addition, the lower limit of the total content is preferably 0%. The total content may be 0%.

From the viewpoint of obtaining glass capable of forming a light-shielding portion having excellent light-shielding properties and a light-transmitting portion having excellent light-transmitting properties with respect to visible light, the total content of Ti ions and W ions is preferably set to the above-described content. On the other hand, when the total content is excessively large, there is a concern that a transmittance of light in a short-wavelength region (wavelength: 300 to 450 nm) may deteriorate in the light-transmitting portion.

In the second embodiment, the contents and ratios of glass components other than the above-described glass components in the oxide glass can be similar as in the first embodiment. In addition, in the second embodiment, the oxide glass can be manufactured in a similar manner as in the oxide glass according to the first embodiment, and has the same glass characteristics. Furthermore, the optical element according to the second embodiment can be manufactured in a similar manner as in the first embodiment.

Third Embodiment

An optical element according to a third embodiment comprises glass having specific gravity of 3.5 or less, the optical element integrally includes a light-transmitting portion in which an internal transmittance at a wavelength of 380 nm in terms of a thickness of 1.0 mm is 96% or more, and a light-shielding portion in which an optical density OD at a wavelength of 1100 nm is 0.5 or more, and the light-transmitting portion and the light-shielding portion have the same glass composition.

The optical element according to the third embodiment comprises glass having a specific gravity of 3.5 or less. The specific gravidity of the glass is preferably 3.4 or less, and more preferably 3.3 or less or 3.2 or less in this order.

When the optical element comprises glass having a specific gravity in the above-described range, breakage of glass in a process of manufacturing the optical element can be prevented, and warpage of glass can be suppressed. On the other hand, when the specific gravity of glass is excessively large, there is a concern that glass is likely to be broken in a process of manufacturing the optical element, and warpage may occur in glass.

The optical element according to the third embodiment integrally includes a light-transmitting portion in which an internal transmittance at a wavelength of 380 nm in terms of a thickness of 1.0 mm is 96% or more, and a light-shielding portion in which an optical density OD at a wavelength of 1100 nm is 0.5 or more.

The optical element according to the third embodiment integrally includes the light-transmitting portion and the light-shielding portion. Specifically, the light-shielding portion is a portion where glass itself is colored, and is preferably formed in a layer shape from a glass surface to an inner side. In addition, a portion where the light-shielding portion is not formed, that is, a non-colored portion that is not colored becomes a light-transmitting portion.

In the optical element according to the third embodiment, the internal transmittance of the light-transmitting portion at a wavelength of 380 nm in terms of a thickness of 1.0 mm is 96% or more, preferably 96.5% or more, and more preferably 97% or more or 98% or more in this order.

Note that, in the present embodiment, a spectral transmittance in a wavelength range of 380 to 1100 nm is measured by using glass samples having a thickness of 2.0 mm±0.1 mm and 10.0 mm±0.1 mm in conformity to JOGIS17 (method of measuring an internal transmittance of optical glass), and a value in terms of a thickness of 1.0 mm is set as the internal transmittance.

In addition, in the optical element according to the third embodiment, the optical density OD of the light-shielding portion at a wavelength of 1100 nm is 0.5 or more, preferably 0.8 or more, and more preferably 1.0 or more or 1.3 or more in this order. On the other hand, the optical density OD of the light-transmitting portion at a wavelength of 1100 nm is preferably 0.15 or less, and more preferably 0.1 or less.

As expressed by the following Expression, the optical density (OD) is expressed as a numerical value obtained by applying a negative sign (minus) to a common logarithm of a ratio of an incident light intensity $I_0$ and a transmitted light intensity $I$.

$$OD=-\log_{10}(I/I_0)$$

In the optical element according to the third embodiment, OD of the light-shielding portion is large, and OD of the light-transmitting portion is small. In measurement of OD, in a case where measurement light passes through both the light-shielding portion and the light-transmitting portion, since OD of the light-transmitting portion is sufficiently small, OD of the light-shielding portion becomes dominant.

In addition, in the optical element including two opposing surfaces, OD in a case of providing light-shielding portion having the same thickness and the same degree of coloration in both the surfaces becomes approximately two times OD in a case of providing the same light-shielding portion only in a single surface.

Furthermore, in the optical element according to the present embodiment, in a wavelength region from a visible region to an infrared region, OD decreases along with an increase in a wavelength. Accordingly, in the light-shielding portion, for example, OD at a wavelength of 780 nm becomes larger than OD at a wavelength of 1100 nm.

Accordingly, in a case where a wavelength region desired to be shielded exists, OD at a wavelength on a long wavelength side in the wavelength region is designed to be high enough to secure the light-shielding properties over the entire wavelength range desired. In the case of designing glass that shields only visible light, OD may be set to be high enough on a long wavelength side (for example, 780 nm) of the visible region. In addition, in the case of designing glass that shields light from the visible region to the near infrared region, OD may be set to be high enough at a wavelength in the near infrared region (for example, a wavelength of 1100 nm). OD can be controlled by adjusting the thickness of the light-shielding portion or the degree of coloration in the light-shielding portion.

In the optical element according to the third embodiment, as described above, since the light-shielding portion is a portion where the glass itself is colored, the light-transmitting portion and the light-shielding portion have the same glass composition. However, in the light-transmitting portion and the light-shielding portion, the valence of the glass component (cation) may be different. In addition, in the present invention, "the same glass composition" represents that composition analysis results match each other within an error range.

Coloration of the light-shielding portion is preferably a reducing color caused by the glass component, and more preferably a reducing color caused by a transition metal. Examples of the transition metal include Ti, Nb, W, and Bi.

In the optical element according to the third embodiment, since the light-shielding portion can be formed in a part of the glass, the light-shielding portion and the light-transmitting portion have the same glass composition, and the light-shielding portion and the light-transmitting portion can be provided in one piece of glass without being joined. In addition, in the present embodiment, the light-shielding portion has sufficient light-shielding properties, and the light-transmitting portion has sufficient light-transmitting properties. Furthermore, in the present embodiment, the light-shielding portion having an arbitrary shape can be formed, and contrast between the light-shielding portion and the light-transmitting portion is clear, and thus the shape of the light-shielding portion can be controlled with high accuracy. In addition, in the glass according to the present embodiment, since the light-shielding portion and the light-transmitting portion have substantially the same refractive index, and thus in a case of being used as cover glass, interface reflection between the light-shielding portion and the light-transmitting portion is suppressed, and stray light can be effectively suppressed.

A method of forming the light-shielding portion can be similar as in the first embodiment. In addition, a shape of the light-shielding portion and characteristics other than the above-described characteristics can be similar as in the first embodiment.

The optical element according to the third embodiment preferably comprises oxide glass containing $P^{5+}$, Nb ions, Bi ions, and $Li^+$ as a glass component. In the present invention, the oxide glass represents glass that contains $O^{2-}$ as an anion component, and the content of $O^{2-}$ is 80 anion % or more.

In the third embodiment, the lower limit of the content of $P^{5+}$ in the oxide glass is preferably 7%, and more preferably 10%, 15%, 22%, or 27% in this order. In addition, the upper limit of the content of $P^{5+}$ is preferably 43%, and more preferably 40%, 37%, 34%, or 32% in this order.

$P^{5+}$ is a glass network forming component. From the viewpoint of obtaining glass that is capable of forming a light-shielding portion having excellent light-shielding properties and a light-transmitting portion having excellent light-transmitting properties with respect to visible light and has low specific gravity, the content of $P^{5+}$ is preferably set to the above-described range. On the other hand, when the content of $P^{5+}$ is excessively large, there is a concern that chemical durability deteriorates, and meltability also deteriorates.

In the third embodiment, the lower limit of the content of Nb ions in the oxide glass is preferably 10%, and more preferably 11%, 12%, 14%, or 16% in this order. In addition, the upper limit of the content of Nb ions is preferably 21%, and more preferably 20%, 19.5%, 19%, or 18% in this order. Nb ions may include Nb ions having different valence including $Nb^{5+}$.

Nb ions are a component that contributes to a high refractive index and increases coloration of glass. In addition, Nb ions have an operation of improving thermal stability and chemical durability of glass. From the viewpoint of obtaining glass capable of forming a light-shielding portion having excellent light-shielding properties and a light-transmitting portion having excellent light-transmitting properties with respect to visible light, the content of Nb ions is preferably set to the above-described range. On the other hand, when the content of Nb ions is excessively large, there is a concern that devitrification resistance of glass may deteriorate, and a transmittance of light in a short-wavelength region (wavelength: 300 to 450 nm) may deteriorate in the light-transmitting portion.

In the third embodiment, the lower limit of the content of $Li^+$ in the oxide glass is preferably 20%, and more preferably 25%, 30%, 35%, or 40% in this order. In addition, the upper limit of the content of $Li^+$ is preferably 60%, and more preferably 55%, 50%, or 47% in this order.

From the viewpoint of obtaining glass that is capable of forming a light-shielding portion having excellent light-shielding properties and a light-transmitting portion having excellent light-transmitting properties with respect to visible light and has low specific gravity, the content of $Li^+$ is preferably set to the above-described range. In addition, it is easy to perform chemical strengthening with respect to glass. On the other hand, when the content of $Li^+$ is excessively large, there is a concern that thermal stability of glass may deteriorate.

In the third embodiment, the lower limit of the total content of Nb ions and $Li^+$ in the oxide glass is preferably 48%, and more preferably 50%, 52%, 54%, or 57% in this order. In addition, the upper limit of the total content is preferably 75%, and more preferably 70%, 66%, or 63% in this order.

From the viewpoint of obtaining glass that is capable of forming a light-shielding portion having excellent light-shielding properties and a light-transmitting portion having excellent light-transmitting properties with respect to visible light and has low specific gravity, the total content of Nb ions and $Li^+$ is preferably set to the above-described range. On the other hand, when the total content is excessively small, there is a concern that the light-shielding properties in the light-shielding portion may deteriorate.

In the third embodiment, the content of Bi ions in the oxide glass is preferably more than 0%, and the lower limit of the content is preferably 0.2%, and more preferably 0.3%, 0.4%, or 0.5% in this order. In addition, the upper limit of the content of Bi ions is preferably 6%, and more preferably 5%, 4%, 2%, or 1% in this order. Bi ions may include Bi ions having different valance including $Bi^{3+}$.

Bi ions contribute a high refractive index and have an operation of increasing coloration of glass. From the viewpoint of obtaining glass that is capable of forming a light-shielding portion having excellent light-shielding properties and a light-transmitting portion having excellent light-transmitting properties with respect to visible light, the content of Bi ions is preferably set to the above-described range. On the other hand, when the content of Bi ions is excessively large, there is a concern that a transmittance of light in a short-wavelength region (wavelength: 300 to 450 nm) may deteriorate in the light-transmitting portion. In addition, content of Bi ions is excessively small, there is a concern that light-shielding properties in the light-shielding portion may deteriorate.

In the third embodiment, the upper limit of the content of $Ba^{2+}$ in the oxide glass is preferably 5%, and more preferably 4%, 3%, 2%, or 1% in this order. In addition, the lower limit of the content of $Ba^{2+}$ is preferably 0%. The content of $Ba^{2+}$ may be 0%.

$Ba^{2+}$ has an operation of improving thermal stability and meltability of glass. From the viewpoint of obtaining glass having low specific gravity, the content of $Ba^{2+}$ is preferably set to the above-described range. On the other hand, when the content of $Ba^{2+}$ is excessively large, there is a concern that the specific gravity may increase, and devitrification resistance may deteriorate. Furthermore, there is a concern that the thermal stability of glass may deteriorate.

In the third embodiment, the upper limit of the content of $Zr^{4+}$ in the oxide glass is preferably 2%, and more preferably 1.5%, 1%, or 0.5% in this order. In addition, the lower limit of the content of $Zr^{4+}$ is preferably 0%. The content of $Zr^{4+}$ may be 0%.

$Zr^{4+}$ has an operation of improving the thermal stability of glass. From the viewpoint of obtaining glass that is capable of forming a light-shielding portion having excellent light-shielding properties and a light-transmitting portion having excellent light-transmitting properties with respect to visible light and has low specific gravity, the content of $Zr^{4+}$ is preferably set to the above-described range. On the other hand, when the content of $Zr^{4+}$ is excessively large, the thermal stability and the meltability of glass tend to deteriorate.

In the third embodiment, the upper limit of the total content of Ti ions and W ions in the oxide glass is preferably 5%, and more preferably 4%, 3%, 2%, or 1% in this order. In addition, the lower limit of the total content is preferably 0%. The total content may be 0%.

From the viewpoint of obtaining glass capable of forming a light-shielding portion having excellent light-shielding properties and a light-transmitting portion having excellent light-transmitting properties with respect to visible light, the total content of Ti ions and W ions is preferably set to the above-described content. On the other hand, when the total content is excessively large, there is a concern that a transmittance of light in a short-wavelength region (wavelength: 300 to 450 nm) may deteriorate in the light-transmitting portion.

In the third embodiment, the lower limit of a cation ratio of the content of $Li^+$ to a total content of $Li^+$, $Na^+$, and $K^+$ [$Li^+/(Li^+ + Na^+ + K^*)$] in the oxide glass is preferably 0.5, and more preferably 0.7, 0.8, 0.9, or 1 in this order. The cation ratio may be 1.

From the viewpoint of obtaining glass that is capable of forming a light-shielding portion having excellent light-shielding properties and a light-transmitting portion having excellent light-transmitting properties with respect to visible light and has low specific gravity, the cation ratio [$Li^+/(Li^+ + Na^+ + K^+)$] is preferably set to the above-described range. On the other hand, when the cation ratio is excessively small, there is a concern that light-shielding properties in the light-shielding portion may deteriorate.

In the third embodiment, the contents and ratios of glass components other than the above-described glass components in the oxide glass can be similar as in the first embodiment. In addition, in the third embodiment, the oxide glass can be manufactured in a similar manner as in the oxide glass according to the first embodiment, and has the same glass characteristics. Furthermore, the optical element according to the third embodiment can be manufactured in a similar manner as in the first embodiment.

Examples

Hereinafter, the present invention will be described in more detail with reference to examples, but the present invention is not limited to the examples.

Glass samples having glass compositions shown in Table 1 were prepared in the following procedure, and various evaluations were performed.

TABLE 1

| | No. | $P^{5+}$ | $B^{3+}$ | $Li^+$ | $Na^+$ | $K^+$ | $Ba^{2+}$ | $Zn^{2+}$ | Ti ions | Nb ions | W ions | Bi ions | $Al^{3+}$ | Sum | $Sb_2O_3$ |
|---|---|---|---|---|---|---|---|---|---|---|---|---|---|---|---|
| Example | 1 | 36.5 | 0.0 | 42.2 | 0.0 | 2.0 | 0.0 | 1.3 | 1.0 | 13.4 | 0.0 | 3.6 | 0.0 | 100.0 | 0.00 |
| | 2 | 29.2 | 3.3 | 48.2 | 0.0 | 0.0 | 0.0 | 1.3 | 1.0 | 13.4 | 0.0 | 3.6 | 0.0 | 100.0 | 0.00 |
| | 3 | 36.5 | 0.0 | 42.2 | 2.0 | 0.0 | 0.0 | 1.3 | 1.0 | 13.4 | 0.0 | 3.6 | 0.0 | 100.0 | 0.00 |
| | 4 | 29.2 | 7.3 | 44.2 | 0.0 | 0.0 | 0.0 | 1.3 | 1.0 | 13.4 | 0.0 | 3.6 | 0.0 | 100.0 | 0.00 |
| | 5 | 29.2 | 7.3 | 40.2 | 0.0 | 0.0 | 0.0 | 1.3 | 0.0 | 14.4 | 0.0 | 3.6 | 0.0 | 100.0 | 0.00 |
| | 6 | 29.2 | 7.3 | 40.2 | 0.0 | 0.0 | 0.0 | 5.3 | 0.0 | 14.4 | 0.0 | 3.6 | 0.0 | 100.0 | 0.00 |
| | 7 | 29.2 | 0.0 | 51.5 | 0.0 | 0.0 | 0.0 | 1.3 | 1.0 | 13.4 | 0.0 | 3.6 | 0.0 | 100.0 | 0.00 |
| | 8 | 29.2 | 7.3 | 44.2 | 0.0 | 0.0 | 0.0 | 0.0 | 0.0 | 17.7 | 0.0 | 1.6 | 0.0 | 100.0 | 0.00 |
| | 9 | 29.2 | 7.3 | 45.5 | 0.0 | 0.0 | 0.0 | 0.0 | 0.0 | 14.4 | 0.0 | 3.6 | 0.0 | 100.0 | 0.00 |
| | 10 | 29.2 | 7.3 | 44.2 | 0.0 | 0.0 | 0.0 | 1.3 | 0.0 | 15.4 | 0.0 | 2.6 | 0.0 | 100.0 | 0.00 |
| | 11 | 29.2 | 8.5 | 44.2 | 0.0 | 0.0 | 0.0 | 0.0 | 0.0 | 14.4 | 0.0 | 3.6 | 0.0 | 100.0 | 0.00 |
| | 12 | 29.2 | 7.3 | 46.2 | 0.0 | 0.0 | 0.0 | 1.3 | 0.0 | 14.4 | 0.0 | 1.6 | 0.0 | 100.0 | 0.00 |
| | 13 | 29.2 | 7.3 | 44.2 | 0.0 | 0.0 | 0.0 | 1.3 | 0.0 | 14.4 | 0.0 | 3.6 | 0.0 | 100.0 | 0.00 |
| | 14 | 29.2 | 7.3 | 44.2 | 0.0 | 0.0 | 0.0 | 1.3 | 0.0 | 16.4 | 0.0 | 1.6 | 0.0 | 100.0 | 0.00 |
| | 15 | 29.2 | 7.3 | 44.2 | 0.0 | 0.0 | 0.0 | 1.3 | 0.0 | 17.4 | 0.0 | 0.6 | 0.0 | 100.0 | 0.00 |
| | 16 | 29.2 | 7.8 | 44.2 | 0.0 | 0.0 | 0.0 | 0.0 | 0.0 | 17.2 | 0.0 | 1.6 | 0.0 | 100.0 | 0.00 |
| | 17 | 29.2 | 8.3 | 44.2 | 0.0 | 0.0 | 0.0 | 0.0 | 0.0 | 16.7 | 0.0 | 1.6 | 0.0 | 100.0 | 0.00 |
| | 18 | 29.2 | 7.3 | 44.7 | 0.0 | 0.0 | 0.0 | 0.0 | 0.0 | 17.2 | 0.0 | 1.6 | 0.0 | 100.0 | 0.00 |
| | 19 | 29.2 | 7.3 | 45.2 | 0.0 | 0.0 | 0.0 | 0.0 | 0.0 | 16.7 | 0.0 | 1.6 | 0.0 | 100.0 | 0.00 |
| | 20 | 29.2 | 7.3 | 46.2 | 0.0 | 0.0 | 0.0 | 1.3 | 0.0 | 14.4 | 0.0 | 1.6 | 0.0 | 100.0 | 0.00 |
| Comparative Example | 21 | 28.0 | 2.9 | 8.5 | 8.0 | 1.9 | 0.8 | 0.0 | 4.0 | 19.5 | 4.0 | 22.4 | 0.0 | 100.0 | 0.10 |
| | 22 | 27.2 | 0.0 | 0.0 | 1.9 | 1.4 | 4.0 | 0.0 | 10.4 | 19.4 | 11.0 | 24.7 | 0.0 | 100.0 | 0.02 |
| | 23 | 27.8 | 3.3 | 13.3 | 11.3 | 3.2 | 1.1 | 0.0 | 3.1 | 15.6 | 3.6 | 17.7 | 0.0 | 100.0 | 0.00 |
| | 24 | 27.8 | 3.3 | 17.5 | 15.0 | 4.3 | 1.1 | 0.0 | 2.4 | 12.1 | 2.8 | 13.7 | 0.0 | 100.0 | 0.00 |
| | 25 | 26.3 | 6.5 | 19.7 | 16.4 | 2.3 | 0.5 | 0.9 | 3.0 | 19.0 | 2.7 | 2.7 | 0.0 | 100.0 | 0.01 |
| | 26 | 26.5 | 6.5 | 20.9 | 16.5 | 2.3 | 0.5 | 0.9 | 8.5 | 5.6 | 8.5 | 3.3 | 0.0 | 100.0 | 0.00 |
| | 27 | 25.7 | 6.5 | 20.3 | 16.0 | 2.3 | 0.5 | 0.9 | 2.7 | 20.2 | 2.7 | 2.2 | 0.0 | 100.0 | 0.00 |
| | 28 | 25.7 | 6.5 | 20.3 | 16.0 | 2.3 | 0.5 | 0.9 | 2.7 | 21.9 | 0.0 | 3.2 | 0.0 | 100.0 | 0.00 |
| | 29 | 25.7 | 6.5 | 20.3 | 16.0 | 2.3 | 0.5 | 0.9 | 0.0 | 21.9 | 2.7 | 3.2 | 0.0 | 100.0 | 0.00 |
| | 30 | 30.6 | 5.1 | 10.7 | 31.7 | 0.0 | 0.0 | 2.6 | 1.6 | 11.0 | 1.7 | 3.0 | 2.0 | 100.0 | 0.00 |
| | 31 | 25.7 | 6.5 | 20.3 | 16.0 | 2.3 | 0.5 | 0.9 | 0.0 | 24.6 | 0.0 | 3.2 | 0.0 | 100.0 | 0.00 |
| | 32 | 26.5 | 6.5 | 20.9 | 16.5 | 2.3 | 0.5 | 0.9 | 0.0 | 22.6 | 0.0 | 3.3 | 0.0 | 100.0 | 0.00 |
| | 33 | 30.6 | 5.1 | 9.9 | 29.5 | 0.0 | 0.0 | 2.6 | 0.0 | 17.3 | 0.0 | 3.0 | 2.0 | 100.0 | 0.00 |
| | 34 | 30.6 | 5.1 | 10.7 | 31.7 | 0.0 | 0.0 | 2.6 | 0.0 | 12.8 | 0.0 | 3.0 | 3.5 | 100.0 | 0.00 |

[Manufacture of Glass]

Oxides, hydroxides, metaphosphates, carbonates, and nitrates corresponding to constituent components of glass were prepared as raw materials, and the raw materials were weighed and combined so that a composition of obtained glass becomes each composition shown in Table 1, and the raw materials were sufficiently mixed. The obtained combined raw material (batch raw material) was fed into a platinum crucible, and was heated at 1000° C. to 1450° C. for two to three hours to obtain molten glass. The molten glass was stirred to be homogenized and clarified, and the molten glass was cast into a mold preheated at an appropriate temperature. The cast glass was subjected to a heat treatment in the vicinity of a glass transition temperature Tg for approximately one hour, and was allowed to be cooled up to room temperature. The glass was processed to a size having dimensions 40 mm (vertical), 60 mm (horizontal), and 15 mm (thickness), and two surfaces having dimensions of 40 mm×60 mm were precisely polished (optically polished) to obtain a glass sample.

[Confirmation of Glass Component Composition]

With respect to the obtained glass sample, the contents of respective glass components were measured by inductively coupled plasma atomic emission spectrometry (ICP-AES), and it was confirmed that the composition is as shown in Table 1.

[Measurement of Optical Characteristics]

With respect to the obtained glass sample, the refractive index nd, the Abbe's number vd, the specific gravidity, the glass transition temperature Tg, and the sag temperature were measured. Results are shown in Table 1.

(i) Refractive Index Nd and Abbe's Number vd

Measurement was performed on the basis of Japanese Industrial Standard JISB-7071-1.

(ii) Specific Gravity

The specific gravity was measured by Archimedes method.

(iii) Glass Transition Temperature Tg and Sag Temperature Ts

The glass transition temperature Tg and the sag temperature Ts were measured by using a thermomechanical analyzer (TMA4000S) manufactured by MAC Science Co., Ltd. at a temperature rising rate of 4° C./minute.

(iv) Internal Transmittance

The obtained glass samples were processed into a thickness of 2.0 mm±0.1 mm and 10.0 mm±0.1 mm, a spectral transmittance in a wavelength range of 380 to 1100 nm was measured in conformity to JOGIS17 (method of measuring an internal transmittance of optical glass), and a value in terms of a thickness of 1.0 mm is set as the internal transmittance. The internal transmittance at a wavelength of 380 nm is shown in Table 2.

[Formation of Light-Shielding Portion]

The obtained glass sample was processed into dimensions of 20 mm (vertical), 20 mm (horizontal), and 1.0 mm (thickness), and two surfaces having dimensions of 20 mm×20 mm were precisely polished (optically polished). A metal film (Pt—Pd film) having an arbitrary shape was formed on one of the optically polished surfaces by sputtering (a current in the sputtering was 15 mA, and a film formation time was 900 sec).

The glass sample on which the metal film was formed was subjected to a heat treatment at a processing temperature shown in Table 2 for six hours while supplying a forming gas (hydrogen: 3 volume %, nitrogen: 97 volume %) at a flow rate of 0.2 L/min as a reducing atmosphere. Note that, the processing temperature was set to a temperature which is lower than the glass transition temperature Tg by 15° C. to 20° C. (range of [Tg−20° C.] to [Tg−15° C.]).

The metal film was peeled off through polishing. A glass sample including a light-shielding portion having approximately the same shape as the formed metal film in a plan view.

[Measurement of OD]

With respect to the glass sample including the light-shielding portion, incident light intensity $I_0$ and transmitted light intensity I at a wavelength of 1100 nm in the light-shielding portion were measured, and OD (optical density) was calculated by the following Expression. A result is shown in Table 2.

$$OD = -\log_{10}(I/I_0)$$

TABLE 2

| | | | | | | | Glass characteristics | | |
|---|---|---|---|---|---|---|---|---|---|
| | | | | | | | | Internal transmittance (%) (380 nm, before treatment) 1 mm thickness | Light-shielding portion forming conditions | |
| | No. | nd | vd | Tg (° C.) | Ts (° C.) | Specific gravity | | Treatment temperature (° C.) | Treatment time (hour) |
| Example | 1 | 1.75824 | 28.72 | 432 | 471 | 3.42 | 97.2 | 415 | 6 |
| | 2 | 1.75516 | 29.34 | 432 | 469 | 3.38 | 97.2 | 415 | 6 |
| | 3 | 1.76024 | 28.72 | 431 | 468 | 3.43 | 97.4 | 415 | 6 |
| | 4 | 1.75322 | 29.50 | 436 | 479 | 3.38 | 97.7 | 420 | 6 |
| | 5 | 1.77098 | 29.64 | 446 | 485 | 3.41 | 98.0 | 430 | 6 |
| | 6 | 1.75836 | 29.76 | 432 | 473 | 3.47 | 98.1 | 415 | 6 |
| | 7 | 1.72420 | 31.38 | 424 | 463 | 3.28 | 98.2 | 410 | 6 |
| | 8 | 1.75575 | 28.93 | 463 | 510 | 3.22 | 98.3 | 455 | 6 |
| | 9 | 1.74844 | 29.94 | 443 | 481 | 3.34 | 98.5 | 430 | 6 |
| | 10 | 1.74747 | 29.85 | 446 | 487 | 3.30 | 98.5 | 430 | 6 |
| | 11 | 1.74742 | 29.98 | 444 | 482 | 3.33 | 98.6 | 430 | 6 |
| | 12 | 1.72378 | 31.74 | 444 | 488 | 3.15 | 98.6 | 430 | 6 |
| | 13 | 1.75103 | 29.90 | 434 | 479 | 3.38 | 98.7 | 420 | 6 |
| | 14 | 1.74622 | 29.82 | 451 | 496 | 3.22 | 98.7 | 440 | 6 |

TABLE 2-continued

|  | No. | | | | | | | |
|---|---|---|---|---|---|---|---|---|
|  | 15 | 1.74384 | 29.78 | 454 | 508 | 3.15 | 98.7 | 440 | 6 |
|  | 16 | 1.75058 | 29.31 | 462 | 504 | 3.15 | 98.7 | 445 | 6 |
|  | 17 | 1.74533 | 29.71 | 460 | 506 | 3.20 | 98.7 | 445 | 6 |
|  | 18 | 1.74876 | 29.46 | 456 | 507 | 3.21 | 98.8 | 445 | 6 |
|  | 19 | 1.74171 | 29.99 | 455 | 503 | 3.13 | 98.9 | 445 | 6 |
|  | 20 | 1.72602 | 31.57 | 437 | 482 | 3.18 | 99.1 | 420 | 6 |
| Comparative Example | 21 | 2.00 | | | 479 | 5.10 | 0.0 | 465 | 6 |
|  | 22 | 2.10 | | | 561 | 5.60 | 0.0 | 545 | 6 |
|  | 23 | 1.93 | | | 454 | 4.76 | 0.0 | 440 | 6 |
|  | 24 | 1.86 | | | 420 | 4.39 | 0.0 | 405 | 6 |
|  | 25 | 1.82 | | | 454 | 3.70 | 15.0 | 440 | 6 |
|  | 26 | 1.80 | | | 447 | 3.84 | 66.5 | 430 | 6 |
|  | 27 | | | | 463 | 3.64 | 81.2 | 450 | 6 |
|  | 28 | | | | 468 | 3.59 | 85.6 | 450 | 6 |
|  | 29 | | | | 452 | 3.73 | 85.7 | 435 | 6 |
|  | 30 | 1.70 | | | 435 | 3.41 | 94.6 | 415 | 6 |
|  | 31 | 1.82 | | | 456 | 3.58 | 94.7 | 440 | 6 |
|  | 32 | 1.80 | | | 454 | 3.57 | 95.5 | 440 | 6 |
|  | 33 | 1.73 | | | 453 | 3.42 | 98.1 | 440 | 6 |
|  | 34 | 1.68 | | | 430 | 3.32 | 98.5 | 415 | 6 |

| | | Light-shielding portion | | | |
|---|---|---|---|---|---|
| | | External transmittance (%) 1100 nm | 1100 nm OD | Glass composition (cation %) | |
| | No. | 1 mm thickness | 1 mm thickness | Ti ions + W ions | Nb ions + Li$^+$ | Li$^+$/(Li$^+$ + Na$^+$ + K$^+$) |
| Example | 1 | 12.86 | 0.89 | 1.0 | 55.6 | 0.95 |
| | 2 | 19.47 | 0.71 | 1.0 | 61.6 | 1.00 |
| | 3 | 11.59 | 0.94 | 1.0 | 55.6 | 0.95 |
| | 4 | 12.49 | 0.90 | 1.0 | 57.6 | 1.00 |
| | 5 | 16.64 | 0.78 | 0.0 | 54.6 | 1.00 |
| | 6 | 19.95 | 0.70 | 0.0 | 54.6 | 1.00 |
| | 7 | 19.71 | 0.71 | 1.0 | 64.9 | 1.00 |
| | 8 | 2.96 | 1.53 | 0.0 | 61.9 | 1.00 |
| | 9 | 18.90 | 0.72 | 0.0 | 59.9 | 1.00 |
| | 10 | 12.86 | 0.89 | 0.0 | 59.6 | 1.00 |
| | 11 | 18.44 | 0.73 | 0.0 | 58.6 | 1.00 |
| | 12 | 23.92 | 0.62 | 0.0 | 60.6 | 1.00 |
| | 13 | 17.22 | 0.76 | 0.0 | 58.6 | 1.00 |
| | 14 | 7.66 | 1.12 | 0.0 | 60.6 | 1.00 |
| | 15 | 10.99 | 0.96 | 0.0 | 61.6 | 1.00 |
| | 16 | 4.00 | 1.40 | 0.0 | 61.4 | 1.00 |
| | 17 | 4.88 | 1.31 | 0.0 | 60.9 | 1.00 |
| | 18 | 0.60 | 2.22 | 0.0 | 61.9 | 1.00 |
| | 19 | 4.73 | 1.33 | 0.0 | 61.9 | 1.00 |
| | 20 | 27.12 | 0.57 | 0.0 | 60.6 | 1.00 |
| Comparative Example | 21 | 0.06 | 3.22 | 8.0 | 28.0 | 0.46 |
| | 22 | 48.817 | 0.31 | 21.4 | 19.4 | 0.00 |
| | 23 | 0.28 | 2.56 | 6.7 | 28.9 | 0.48 |
| | 24 | 2.347 | 1.63 | 5.2 | 29.6 | 0.48 |
| | 25 | 0.39 | 2.41 | 5.7 | 38.7 | 0.51 |
| | 26 | 0.001 | 5.00 | 17.0 | 26.5 | 0.53 |
| | 27 | 0.188 | 2.73 | 5.4 | 40.5 | 0.53 |
| | 28 | 0.008 | 4.10 | 2.7 | 42.2 | 0.53 |
| | 29 | 0.011 | 3.96 | 2.7 | 42.2 | 0.53 |
| | 30 | 67.59 | 0.17 | 3.3 | 21.7 | 0.25 |
| | 31 | 1.84 | 1.73 | 0.0 | 44.9 | 0.53 |
| | 32 | 1.70 | 1.77 | 0.0 | 43.5 | 0.53 |
| | 33 | 40.48 | 0.39 | 0.0 | 27.2 | 0.25 |
| | 34 | 66.86 | 0.17 | 0.0 | 23.5 | 0.25 |

What is claimed is:

1. An oxide glass, wherein:
a content of $P^{5+}$ is 7 to 43 cation %,
a content of Nb ions is 10 to 21 cation %,
a content of Li$^+$ is 30 cation % or more,
a total content of Nb ions and Li$^+$ is 48 to 70 cation %,
a content of Bi ions is more than 0 cation % and is equal to or less than 6 cation %,
a content of Ba$^{2+}$ is 5 cation % or less,
a content of Zr$^{4+}$ is 2 cation % or less,
a total content of Ti ions and W ions is 5 cation % or less, and
a cation ratio of the content of Li$^+$ to a total content of Li$^+$, Na$^+$, and K$^+$ [Li$^+$/(Li$^+$+Na$^+$+K$^+$)] is 0.7 or more.

2. The oxide glass according to claim 1, wherein the content of Li$^+$ is 40 cation % or more.

3. The oxide glass according to claim 1, wherein:
the content of $P^{5+}$ is 27 to 43 cation %,
the content of Li$^+$ is 35 cation % or more,
the total content of Ti ions and W ions is 4 cation % or less, and a cation ratio of the total content of Ti ions, Nb ions, W ions, and Bi ions to the total content of $P^{5+}$, $B^{3+}$, and $Si^{4+}$ [(Ti+Nb+W+Bi)/($P^{5+}$+$B^{3+}$+$Si^{4+}$)] is 0.7 or less.

4. The oxide glass according to claim 1, wherein;
the content of $P^{5+}$ is 27 to 43 cation %,
the content of $Li^+$ is 40 cation % or more,
the total content of Ti ions and W ions is 4 cation % or less, and
a cation ratio of the total content of Ti ions, Nb ions, W ions, and Bi ions to the total content of $P^{5+}$, $B^{3+}$, and $Si^{4+}$ [(Ti+Nb+W+Bi)/($P^{5+}$+$B^{3+}$+$Si^{4+}$)] is 0.7 or less.

5. The oxide glass according to claim 1, wherein the oxide glass has a specific gravity of 3.5 or less.

6. An optical element comprising the oxide glass according to claim 1.

7. The optical element according to claim 6, wherein the optical element is a cover glass.

8. The optical element according to claim 6 integrally comprising:
a light-transmitting portion; and
a light-shielding portion in which a transmittance of visible light is smaller in comparison to the light-transmitting portion,
wherein a total content of Nb ions and $Li^+$ is 50 cation % or more in the oxide glass.

9. The optical element according to claim 8, wherein the oxide glass has a specific gravity of 3.5 or less.

10. The optical element according to claim 8, wherein the optical element is a cover glass.

11. The optical element according to claim 6, wherein:
the oxide glass has a specific gravity of 3.5 or less,
the optical element integrally includes a light-transmitting portion in which an internal transmittance at a wavelength of 380 nm in terms of a thickness of 1.0 mm is 96% or more, and a light-shielding portion in which an optical density OD at a wavelength of 1100 nm is 0.5 or more, and
the light-transmitting portion and the light-shielding portion have the same glass composition.

12. The optical element according to claim 11, wherein the light-shielding portion and the light-transmitting portion have substantially the same refractive index.

13. The optical element according to claim 11, wherein the optical element is a cover glass.

* * * * *